(12) United States Patent
Iida et al.

(10) Patent No.: US 10,688,644 B2
(45) Date of Patent: Jun. 23, 2020

(54) POWER TOOL

(71) Applicant: MAKITA CORPORATION, Anjo-shi, Aichi (JP)

(72) Inventors: Hitoshi Iida, Anjo (JP); Masanori Furusawa, Anjo (JP); Kei Watanabe, Anjo (JP); Takafumi Kotsuji, Anjo (JP); Keisuke Yamada, Anjo (JP)

(73) Assignee: MAKITA CORPORATION, Anjo (JP)

( * ) Notice: Subject to any disclaimer, the term of this patent is extended or adjusted under 35 U.S.C. 154(b) by 278 days.

(21) Appl. No.: 15/801,731

(22) Filed: Nov. 2, 2017

(65) Prior Publication Data

US 2018/0126534 A1 May 10, 2018

(30) Foreign Application Priority Data

Nov. 4, 2016 (JP) ................................ 2016-216411
Apr. 12, 2017 (JP) ................................ 2017-079291

(51) Int. Cl.
*B25D 11/12* (2006.01)
*B23B 49/00* (2006.01)
(Continued)

(52) U.S. Cl.
CPC ............ *B25D 11/12* (2013.01); *B23B 49/003* (2013.01); *B25D 16/003* (2013.01); *B25D 17/043* (2013.01); *B25D 17/24* (2013.01); *B25F 5/02* (2013.01); *H01M 2/1022* (2013.01); *H01M 2/1094* (2013.01); *H02K 7/145* (2013.01); *B23B 2260/128* (2013.01); *B25D 2211/003* (2013.01);
(Continued)

(58) Field of Classification Search
CPC ...... B25D 11/12; B25D 16/003; B25D 17/24; B25D 2211/068; B25D 2216/0023; B25D 2216/0084; B25D 2250/121; B25D 2250/265; H02K 7/145; H01M 2/1022; H01M 2/1094; H01M 2220/30; H01M 2/102
USPC ........................................ 173/217, 216, 170
See application file for complete search history.

(56) References Cited

U.S. PATENT DOCUMENTS

2006/0144604 A1* 7/2006 Soika .................... B25D 16/00
173/162.2
2008/0032190 A1* 2/2008 Furuta ...................... B25F 5/02
429/163
(Continued)

FOREIGN PATENT DOCUMENTS

JP 2014-148014 A 8/2014

*Primary Examiner* — Nathaniel C Chukwurah
(74) *Attorney, Agent, or Firm* — Oliff PLC

(57) ABSTRACT

A power tool includes a motor, a housing, a battery mounting part, and a battery protection part. The battery mounting part is provided to the housing on an opposite side from a working axis across the motor in an extending direction of a rotation axis of the motor. The battery mounting part is configured such that one end portion of at least one battery is mounted to the battery mounting part and an opposite end portion of the at least one battery in the extending direction of the rotation axis is exposed from the housing. The battery protection part is provided to an outer surface portion of the housing and configured to protect at least one corner region of the opposite end portion of the at least one battery against external force when the one end portion is mounted to the battery mounting part.

19 Claims, 13 Drawing Sheets

(51) Int. Cl.
*B25F 5/02* (2006.01)
*B25D 17/04* (2006.01)
*B25D 16/00* (2006.01)
*B25D 17/24* (2006.01)
*H01M 2/10* (2006.01)
*H02K 7/14* (2006.01)

(52) U.S. Cl.
CPC .......... *B25D 2211/068* (2013.01); *B25D 2216/0015* (2013.01); *B25D 2216/0023* (2013.01); *B25D 2216/0084* (2013.01); *B25D 2250/121* (2013.01); *B25D 2250/221* (2013.01); *B25D 2250/265* (2013.01); *H01M 2220/30* (2013.01)

(56) References Cited

U.S. PATENT DOCUMENTS

| | | | | |
|---|---|---|---|---|
| 2009/0321101 | A1* | 12/2009 | Furusawa | B25D 17/043 173/162.2 |
| 2011/0308831 | A1* | 12/2011 | Martinsson | B25F 5/02 173/217 |
| 2015/0328764 | A1 | 11/2015 | Yoshikane et al. | |

* cited by examiner

POWER TOOL

CROSS-REFERENCE TO RELATED APPLICATION

The present application claims priority to Japanese patent application No. 2016-216411 filed on Nov. 4, 2016, and Japanese patent application No. 2017-079291 filed on Apr. 12, 2017. The contents of the foregoing applications are incorporated fully herein by reference.

TECHNICAL FIELD

The present teachings relate to a power tool to which a battery can be removably mounted.

BACKGROUND

Various power tools are known which are powered by a rechargeable battery. For example, Japanese Unexamined Patent Application Publication No. 2014-148014 discloses an impact tool which causes a tool bit to linearly move on a striking axis extending in a front-rear direction of the impact tool. This impact tool includes a tool body that houses a motor, and a handgrip that is connected to a rear end portion of the tool body and extending in an up-down direction. In the tool body, a battery mounting part is provided behind the motor and below the handgrip. Two batteries can be removably mounted to the battery mounting part.

SUMMARY

Unlike the above-described impact tool, there may be a case in which the battery is mounted, not behind the motor, but below the motor. In such a case, typically, the whole battery (except an upper portion of the battery which is mounted to the tool body) tends to be exposed to the outside of the tool body. Thus, when an external force is applied to the battery by some cause, by dropping of the tool body, for example, the risk of damage to the battery may increase. Therefore, in the case in which the battery is mounted in such a position, it may be desirable to take measures against damage to an exposed portion of the battery which is exposed from the tool body (the housing).

The present teachings provide a technique that may contribute to measures against damage to a portion of a battery which is exposed from the housing, in a power tool to which the battery can be removably mounted.

According to one aspect of the present teachings, a power tool is provided which includes a motor, a housing, a battery mounting part and a battery protection part.

The motor has a rotation axis. The rotation axis extends in a direction crossing a working axis, which extends in a front-rear direction of the power tool. The housing houses the motor. The battery mounting part is configured such that at least one battery can be removably mounted to the battery mounting part. Further, the battery mounting part is provided to the housing on an opposite side from the working axis across the motor in an extending direction of the rotation axis. The battery protection part is provided to an outer surface portion of the housing. The battery mounting part is configured such that one end portion of the at least one battery is mounted to the battery mounting part, and an opposite end portion of the at least one battery in the extending direction of the rotation axis is exposed from the housing. The battery protection part is configured to protect at least one corner region of the opposite end portion of the at least one battery against external force when the one end portion of the at least one battery is mounted to the battery mounting part.

The "power tool" may generally refer to a tool which is operated by power supply from a battery and which may be used in industry, construction etc. Further, the "working axis" of the power tool may correspond, for example, to a driving axis of a striking element in a so-called impact tool (e.g. hammer drill) which is configured to linearly drive the striking element. The "working axis" may also correspond, for example, to a rotation axis of a final output shaft in a so-called rotary tool (e.g. shear wrench) which is configured to rotationally drive the final output shaft.

The housing may also be referred to as a tool body. The housing may be configured to house at least the motor. For example, the housing may be formed by connecting a portion for housing the motor and another portion separately prepared for housing the other internal mechanisms together. Further, the housing may be configured as a so-called vibration-isolating housing that includes a plurality of housing parts which are connected to each other via an elastic element, such that the housing parts are movable relative to each other.

The shape of the battery which can be mounted to the battery mounting part is not particularly limited, but a typical shape of the battery may be a generally rectangular parallelepiped shape (including a chamfered shape). In the case of the generally rectangular parallelepiped battery, a corner region may also be described as a region corresponding to a vertex of the rectangular parallelepiped. Further, being "exposed from the housing" may also be described as being arranged on the outside of the housing, or as being exposed such that it is open to the outside.

When one end portion of a battery is mounted to a battery mounting part, corner regions of an opposite end portion exposed to the outside may be more liable to be damaged by external force than the other regions. The power tool according to the present aspect, however, by virtue of the battery protection part, can protect at least one corner region of the opposite end portion of the battery against the external force and thereby reduce the risk of damage to the battery.

According to one aspect of the present teachings, the battery protection part may be formed by a portion of the housing. According to the present aspect, the battery protection part can be easily formed without increasing the number of parts.

According to one aspect of the present teachings, the battery protection part may be formed as a separate member from the housing and mounted to the housing. The method of mounting the battery protection part to the housing is not particularly limited. For example, the battery protection part may be formed in advance of a material which may be the same as or different from the housing, and mounted to the housing by bonding, fastening with screws, clamping or other methods. Alternatively, the battery protection part formed of a different material from the housing may be mounted to the housing by integral molding. According to the present aspect, the degree of freedom of design of the battery protection part can be enhanced while the housing is kept in a simple shape.

According to one aspect of the present teachings, the battery protection part may be formed of a different material from the housing. According to the present aspect, the housing and the battery protection part can be formed of respectively appropriate materials.

According to one aspect of the present teachings, the battery protection part may include a front protection part and a rear protection part. The front protection part and the rear protection part may be respectively arranged on opposite sides of the battery mounting part in the front-rear direction. According to the present aspect, by providing the two protection parts (the front protection part and the rear protection part) on the front and rear sides of the battery mounting part, both the front and rear corner regions can be protected against external force.

According to one aspect of the present teachings, the battery protection part may include a pair of front protection parts and a pair of rear protection parts. The pair of front protection parts may be arranged on opposite sides of a front region of the battery mounting part in a direction crossing the working axis and the rotation axis. The pair of rear protection parts may be arranged on opposite sides of a rear region of the battery mounting part in the direction crossing the working axis and the rotation axis. By providing the protection parts on the opposite sides of each of the front and rear regions of the battery mounting part, both the front and rear corner regions can be protected against external force.

According to one aspect of the present teachings, the battery mounting part may be configured such that a plurality of batteries can be removably mounted side by side in the front-rear direction to the battery mounting part. Compared with a power tool to which only one battery can be mounted, the power tool according to the present aspect is capable of outputting higher power by using the plurality of batteries mounted to the battery mounting part.

According to one aspect of the present teachings, when the power tool is arranged such that the working axis extends in a horizontal direction and the rotation axis extends in a vertical direction, the battery mounting part may be arranged below the motor. The battery protection part may be configured such that a lower surface of the battery protection part is generally flush with a lower surface of the battery when the battery is mounted to the battery mounting part. According to the present aspect, the power tool can be placed on the ground or floor in a stable posture with the lower surfaces of the battery protection part and the battery as placing surfaces.

According to one aspect of the present teachings, the battery protection part may be configured to protrude from a prescribed virtual plane in a direction away from a center of gravity of the power tool. Here, the center of gravity of the power tool refers to a center of gravity of the power tool having the battery mounted to battery mounting part. The prescribed virtual plane is perpendicular to a virtual line that connects the center of gravity of the power tool and the corner region, and the prescribed virtual plane also passes through the corner region. There may be a case in which the power tool drops with the battery mounted thereto, in a state that the center of gravity of the power tool is located right above a corner region (or the entire weight of the power tool acts on a corner region). Generally, if the corner region collides with the ground or floor in such a state, impact upon the corner region may increase and the risk of damage to the corner region may thus increase. According to the present aspect, the battery protection part may be formed to protrude from the above-described virtual plane, so that even if the power tool drops in the state that the center of gravity is located right above the corner region, the battery protection part can first collide with the ground or floor and thereby effectively protect the corner region.

According to one aspect of the present teachings, the power tool may further include an additional mechanism arranged in an internal space of the battery protection part. The additional mechanism may be configured to have a different function from protection of the corner region of the battery. According to the present aspect, the convenience of the power tool can be enhanced by utilizing the internal space of the battery protection part, which is likely to become a free space.

According to one aspect of the present teachings, the portion of the housing forming the battery protection part may be formed of resin. The power tool may further include a metal reinforcing member. At least a portion of the reinforcing member may be arranged in the battery protection part. According to the present aspect, the risk of damage to the battery protection part can be reduced when the battery protection part receives the external force. Therefore, the risk of damage to the battery can be more reliably reduced.

According to one aspect of the present teachings, the battery mounting part may be configured such that plural kinds of batteries having different lengths in the extending direction of the rotation axis can be selectively removably mounted to the battery mounting part. The battery protection part may be configured to be adjustable in length in the extending direction of the rotation axis. According to the present aspect, the length of the battery protection part can be adjusted according to the length of the battery to be actually mounted to the battery mounting part. Thus, the corner region of the mounted battery can be properly protected.

DETAILED DESCRIPTION OF THE EMBODIMENTS

Embodiments are now described with reference to the drawings. In the following embodiments, a hammer drill is described as an example of the power tool.

First Embodiment

A hammer drill 101 according to a first embodiment of the present teachings is now described with reference to FIGS.

1 and 2. The hammer drill 101 is configured to perform an operation (a hammering operation) of linearly driving a tool accessory 18 along a prescribed working axis A1, and an operation (a drilling operation) of rotationally driving the tool accessory 18 around the working axis A1 by using a battery 9 as a power source.

Figure 1:
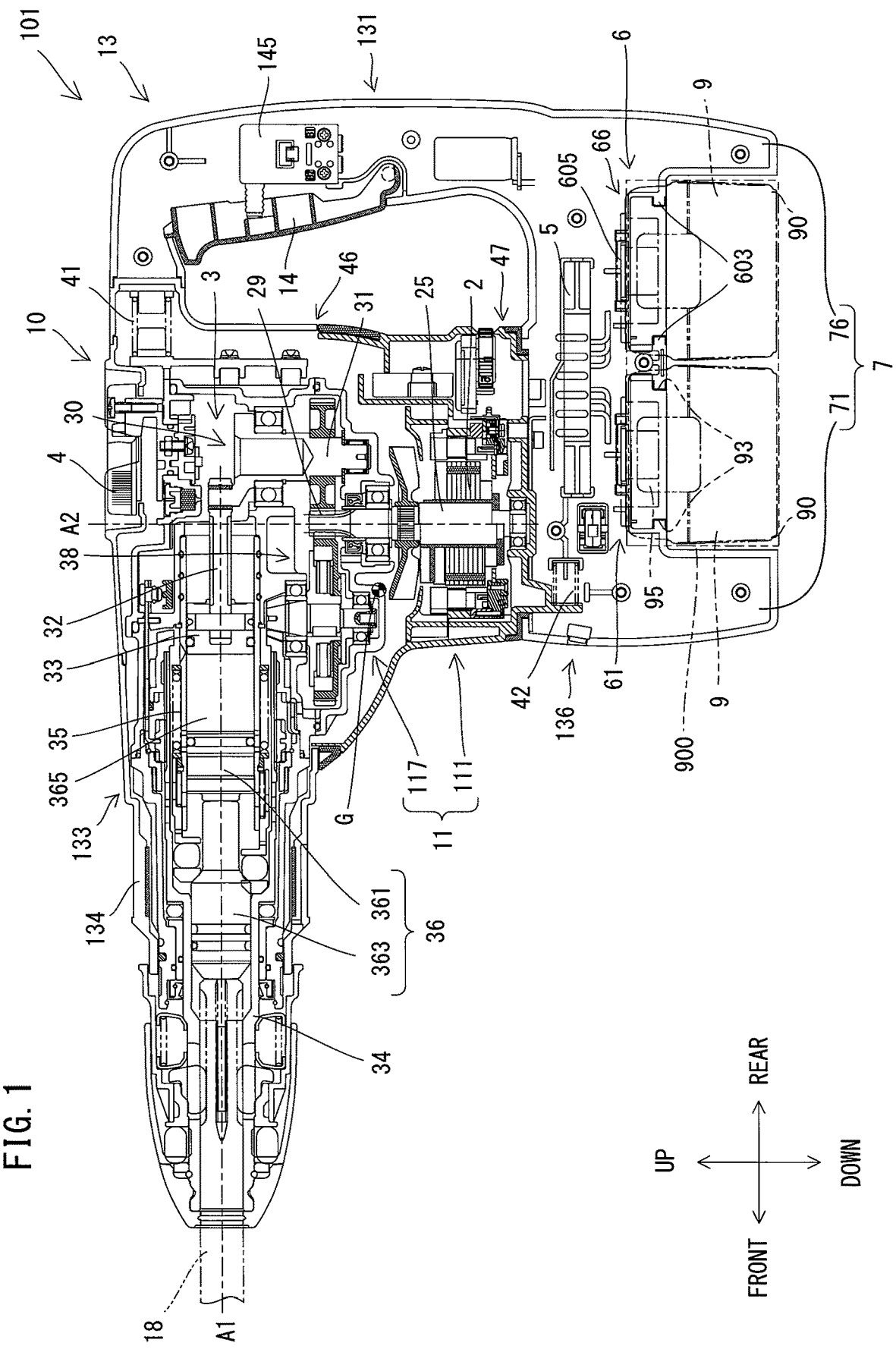
FIG. 1 is a longitudinal sectional view of a hammer drill according to an embodiment.

First, the general structure of the hammer drill 101 is briefly described. As shown in FIG. 1, an outer shell of the hammer drill 101 is mainly formed by a housing 10. The housing 10 of the present embodiment is configured as a so-called vibration-isolating housing. The housing 10 includes a first housing 11 and a second housing 13 which is elastically connected to the first housing 11 such that the first housing 11 and the second housing 13 are movable relative to each other.

The first housing 11 includes a motor housing part 111 and a driving mechanism housing part 117. The motor housing part 111 houses a motor 2. The driving mechanism housing part 117 houses a driving mechanism 3 that is configured to drive the tool accessory 18 by the power of the motor 2. The first housing 11 is generally L-shaped as a whole. The driving mechanism housing part 117 has an elongate shape extending in a direction of the working axis A1. A tool holder 34 is disposed in one end region of the driving mechanism housing part 117 in the extending direction of the working axis A1 (hereinafter also referred to as the working axis A1 direction). The tool holder 34 is configured such that the tool accessory 18 can be removably attached to the tool holder 34. The motor housing part 111 is fixedly connected in a relatively immovable manner to the other end region of the driving mechanism housing part 117 in the working axis A1 direction. The motor housing part 111 is arranged to protrude in a direction crossing the working axis A1 and away from the working axis A1. The motor 2 is disposed in the motor housing part 111 such that a rotation axis A2 of a motor shaft 25 extends in a direction perpendicular to the working axis A1.

In the following description, for the sake of explanation, the working axis A1 direction of the hammer drill 101 is defined as a front-rear direction of the hammer drill 101. One end side of the hammer drill 101 on which the tool holder 34 is provided is defined as a front side of the hammer drill 101 and the opposite side is defined as a rear side. Further, an extending direction of the rotation axis A2 (hereinafter also referred to as the rotation axis A2 direction) of the motor shaft 25 is defined as an up-down direction of the hammer drill 101, a direction toward which the motor housing part 111 protrudes from the driving mechanism housing part 117 is defined as a downward direction and the opposite direction is defined as an upward direction.

The second housing 13 includes a grip part 131, an upper part 133 and a lower part 136. The second housing 13 is generally U-shaped as a whole. The grip part 131 is configured to be held by a user. The grip part 131 is a portion that is arranged to extend in the direction of the rotation axis A2 of the motor shaft 25 (i.e. in the up-down direction). More specifically, the grip part 131 is arranged apart rearward from the first housing 11 and extends in the up-down direction. The upper part 133 is a portion that is connected to an upper end portion of the grip part 131. In the present embodiment, the upper part 133 extends forward from the upper end portion of the grip part 131. The upper part 133 is configured to cover the most part of the driving mechanism housing part 117 of the first housing 11. The lower part 136 is a portion that is connected to a lower end portion of the grip part 131. In the present embodiment, the lower part 136 extends forward from the lower end portion of the grip part 131. The lower part 136 is arranged on a lower side of the motor housing part 111. A battery mounting part 6 is provided on a lower end portion of the lower part 136, in a center portion in the front-rear direction. The hammer drill 101 is configured to operate by power supply from the battery 9 mounted to the battery mounting part 6.

With the above-described structure, in the hammer drill 101, the motor housing part 111 of the first housing 11 and the second housing 13 together form an outer surface of the hammer drill 101. The motor housing part 111 is exposed to the outside, in a state in which it is arranged between the upper part 133 and the lower part 136 in the up-down direction.

The structure of the hammer drill 101 is now explained in detail. First, the vibration-isolating housing structure of the housing 10 is briefly explained. As described above, in the housing 10, the second housing 13 including the grip part 131 is elastically connected to the first housing 11, which houses the motor 2 and the driving mechanism 3, such that the first housing 11 and the second housing 13 are movable relative to each other. With such a structure, transmission of vibration from the first housing 11 to the second housing 13 (particularly, to the grip part 131) can be suppressed.

More specifically, as shown in FIG. 1, a pair of right and left first springs 41 are disposed between the driving mechanism housing part 117 of the first housing 11 and the upper part 133 of the second housing 13. Further, a second spring 42 is disposed between the motor housing part 111 of the first housing 11 and the lower part 136 of the second housing 13. In the present embodiment, the first springs 41 and the second spring 42 are configured as compression coil springs. The first springs 41 and the second spring 42 bias the first housing 11 and the second housing 13 in a direction in which the grip part 131 is biased away from the first housing 11 in the working axis A1 direction.

Further, the upper and lower parts 133, 136 are configured to be slidable with respect to the upper and lower end portions of the motor housing part 111, respectively. More specifically, a lower surface of the upper part 133 and an upper end surface of the motor housing part 111 are configured as sliding surfaces to make sliding contact with each other in the working axis A1 direction. The lower surface of the upper part 133 and the upper end surface of the motor housing part 111 form an upper sliding part 46. Further, an upper surface of the lower part 136 and a lower end surface of the motor housing part 111 are configured as sliding surfaces to make sliding contact with each other in the working axis A1 direction. The upper surface of the lower part 136 and the lower end surface of the motor housing part 111 form a lower sliding part 47. The upper sliding part 46 and the lower sliding part 47 each serve as a sliding guide for guiding the first housing 11 and the second housing 13 to move with respect to each other in the working axis A1 direction. With this structure, vibration in the working axis A1 direction can be effectively prevented from being transmitted to the grip part 131. The vibration in the working axis A1 direction is the largest and most dominant of vibrations that are generated during the hammering operation.

The detailed structure of the first housing 11 and its internal structure are now explained.

As shown in FIG. 1, the motor housing part 111 of the first housing 11 has a bottomed rectangular tube shape having an open upper end. A lower end region of a rear portion of the driving mechanism housing part 117 is disposed within an upper end region of the motor housing part 111, and the driving mechanism housing part 117 is fixedly connected to the motor housing part 111 in a relatively immovable manner. In the present embodiment, a compact and high-output brushless motor is disposed as the motor 2 in the motor housing part 111. The motor shaft 25 extends in the up-down direction. The upper and lower end portions of the motor shaft 25 are rotatably supported by bearings. The upper end portion of the motor shaft 25 protrudes into the driving mechanism housing part 117. The driving gear 29 is provided on the upper end portion of the motor shaft 25 (i.e. the portion that protrudes into the driving mechanism housing part 117).

The driving mechanism housing part 117 of the first housing 11 houses the driving mechanism 3. The driving mechanism 3 of the present embodiment includes a motion converting mechanism 30, a striking mechanism 36 and a rotation transmitting mechanism 38.

The motion converting mechanism 30 is configured to convert rotational motion of the motor 2 (motor shaft 25) into linear motion and then transmit the converted motion to the striking mechanism 36. In the present embodiment, a crank mechanism is employed as the motion converting mechanism 30. More specifically, the motion converting mechanism 30 includes a crank shaft 31, a connecting rod 32, a piston 33 and a cylinder 35. The crank shaft 31 is arranged in parallel to the motor shaft 25 in a rear end region of the driving mechanism housing part 117. The crank shaft 31 has a driven gear which is engaged with the driving gear 29, and an eccentric pin. One end portion of the connecting rod 32 is connected to the eccentric pin. The other end portion of the connecting rod 32 is connected to the piston 33 via a connecting pin. The piston 33 is slidably disposed within the circular cylindrical cylinder 35. The cylinder 35 is coaxially and fixedly connected to a rear portion of the tool holder 34. The tool holder 34 is disposed within a front end region of the driving mechanism housing part 117. When the motor 2 is driven, the piston 33 is caused to reciprocate within the cylinder 35 in the working axis A1 direction.

The striking mechanism 36 includes a striker 361 and an impact bolt 363. The striker 361 is disposed within the cylinder 35 so as to be slidable in the working axis A1 direction. An air chamber 365 is formed between the striker 361 and the piston 33. The air chamber 365 serves to linearly move a striking element in the form of the striker 361 via air pressure fluctuations caused by the reciprocating movement of the piston 33. The impact bolt 363 is configured as an intermediate element for transmitting kinetic energy of the striker 361 to the tool accessory 18. The impact bolt 363 is disposed within the tool holder 34 so as to be slidable in the working axis A1 direction.

When the motor 2 is driven and the piston 33 is moved forward, the air in the air chamber 365 is compressed so that the internal pressure increases. Therefore, the striker 361 is pushed forward at high speed and collides with the impact bolt 363, thereby transmitting its kinetic energy to the tool accessory 18. As a result, the tool accessory 18 is linearly driven along the working axis A1 and strikes a workpiece. On the other hand, when the piston 33 is moved rearward, the air in the air chamber 365 expands so that the internal pressure decreases and the striker 361 is retracted rearward. The hammer drill 101 performs the hammering operation by causing the motion converting mechanism 30 and the striking mechanism 36 to repeatedly perform such operations.

The rotation transmitting mechanism 38 is configured to transmit the rotating power of the motor shaft 25 to the tool holder 34. In the present embodiment, the rotation transmitting mechanism 38 is configured as a gear speed reducing mechanism including a plurality of gears, and transmits the rotating power of the motor 2 to the tool holder 34, with a decelerated rotation speed. Further, an engagement clutch is disposed on a power transmission path of the rotation transmitting mechanism 38. When the clutch is engaged, the rotating power of the motor shaft 25 is transmitted to the tool holder 34 via the rotation transmitting mechanism 38, so that the tool accessory 18 coupled to the tool holder 34 is rotationally driven around the working axis A1. When the clutch 39 is disengaged, power transmission to the tool holder 34 via the rotation transmitting mechanism 38 is interrupted, so that the tool accessory 18 is not rotationally driven.

The hammer drill 101 of the present embodiment is configured such that either one of two drive modes, that is, a hammer mode and a hammer drill mode, can be selected by operating a mode switching dial 4. The mode switching dial 4 is rotatably disposed on the top of the driving mechanism housing part 117. In the hammer mode, the clutch 39 is disengaged and only the motion converting mechanism 30 is driven, so that only the hammering operation is performed. In the hammer drill mode, the clutch 39 is engaged and the motion converting mechanism 30 and the rotation transmitting mechanism 38 are driven, so that the hammering operation and the drilling operation are performed. A mechanism for such mode switching is a well-known art, and therefore description of the mechanism is omitted here.

The detailed structure of the second housing 13 and its internal structure are now explained.

As shown in FIG. 1, a rear portion of the upper part 133 has a generally rectangular box-like shape having an open bottom. The rear portion of the upper part 133 covers a rear portion of the driving mechanism housing part 117 (more specifically, a portion of the driving mechanism housing part 117 in which the motion converting mechanism 30 and the rotation transmitting mechanism 38 are housed) from above. Further, a front portion of the upper part 133 forms a circular cylindrical barrel 134. The barrel 134 covers an outer periphery of a front portion (more specifically, a portion in which the tool holder 34 is housed) of the driving mechanism housing part 117. Further, an auxiliary handle is removably attached to an outer periphery of the barrel 134. The auxiliary handle is well known, and therefore its detailed description and drawing are omitted here.

A trigger 14 which can be pressed by a user is provided on a front side of the grip part 131. A switch 145 is provided within the cylindrically shaped grip part 131 and configured to be turned on and off in response to an operation of the trigger 14.

The lower part 136 has a rectangular box-like shape having a partially open top. The lower part 136 is arranged on the lower side of the motor housing part 111. A controller 5 is disposed within the lower part 136. The controller 5 is electrically connected to the motor 2, the switch 145 and the battery mounting part 6 via wiring (not shown). The controller 5 is configured to start energization of the motor 2 (in other words, driving of the tool accessory 18) when the trigger 14 is pressed and the switch 145 is turned on. Further, the controller 5 is configured to stop energization of the motor 2 when the trigger 14 is released and the switch 145 is turned off.

As described above, the battery mounting part 6 is provided on the lower end portion of the lower part 136, in the center portion in the front-rear direction. In the present embodiment, the battery mounting part 6 includes two mounting parts. The two mounting parts have the same structure and disposed side by side in the front-rear direction. The front one of the two mounting parts is hereinafter referred to as a front mounting part 61, and the rear one of the two mounting parts is hereinafter referred to as a rear mounting part 66. The front mounting part 61 and the rear mounting part 66 are each configured such that a rechargeable battery 9 can be removably mounted thereto. Thus, two batteries 9 can be removably mounted side by side in the front-rear direction on the battery mounting part 6. Therefore, compared with a hammer drill to which only one battery 9 can be mounted, the hammer drill 101 is capable of outputting higher power. Further, the battery 9 which can be removably mounted to the hammer drill 101 of the present embodiment has a capacity of 18 volt.

Figure 2:
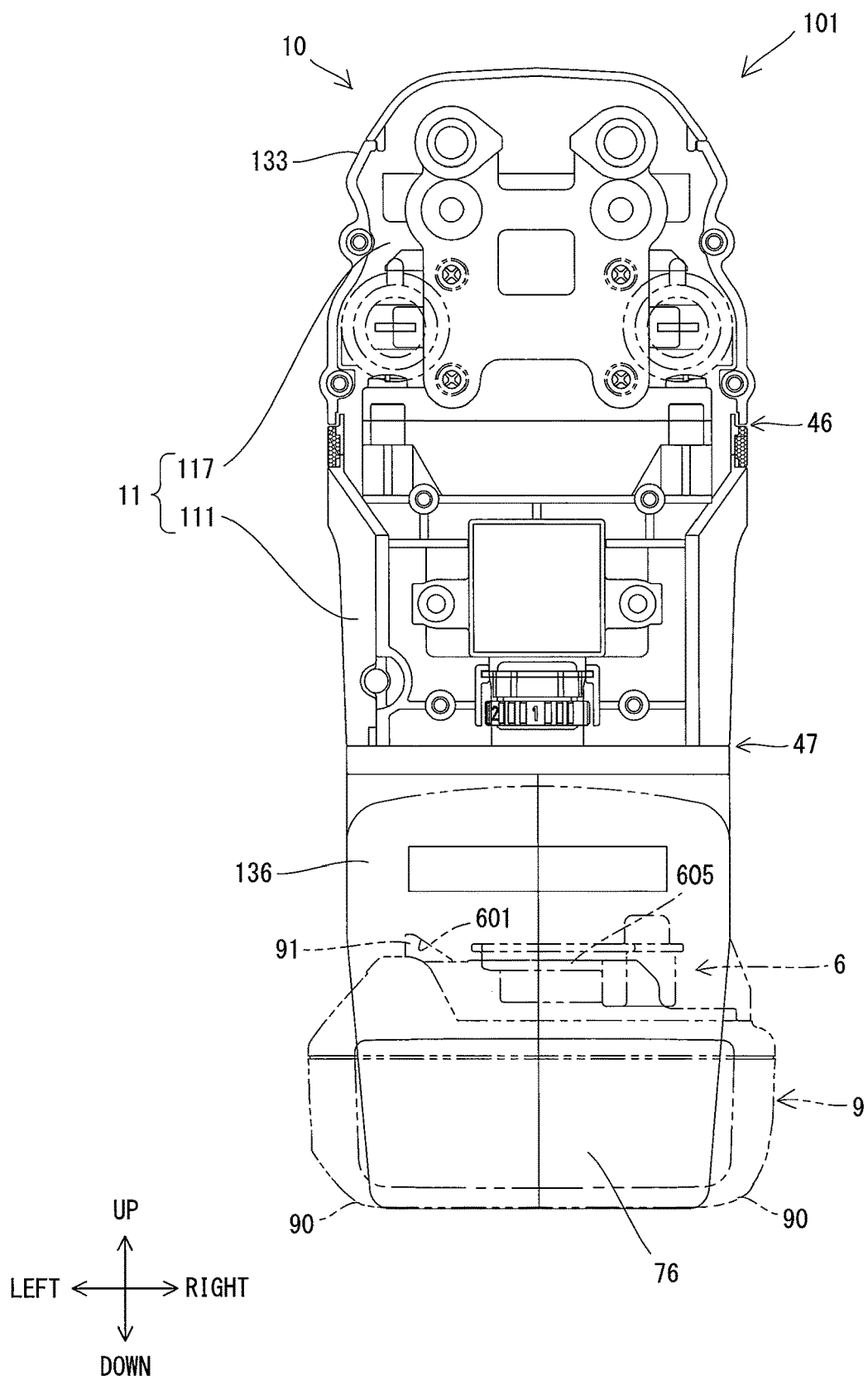
FIG. 2 is an explanatory drawing in a rear view of the hammer drill with a portion of a housing removed.

The structure of the battery 9 is now briefly explained. As shown in FIGS. 1 and 2, the battery 9 has a generally rectangular parallelepiped shape. The battery 9 has a hook 91, a terminal (not shown), a pair of guide grooves 93 and a button 95. For the sake of explanation, an up-down direction of the battery 9 is defined in the state that the battery 9 is mounted to the hammer drill 101.

The hook 91 and the terminal are provided on an upper surface of the battery 9. The hook 91 is provided on one end portion of the battery 9 in a longitudinal direction (a direction perpendicular to the paper face of FIG. 1, a right-left direction of FIG. 2). The hook 91 is normally biased by a spring (not shown) to protrude upward from the upper surface of the battery 9. The hook 91 is configured to be retracted downward from the upper surface when the button 95 provided on a side surface of the battery 9 is pressed. The terminal is provided adjacent to the hook 91 on the upper surface of the battery 9. The pair of guide grooves 93 are formed to linearly extend in the longitudinal direction of the battery 9 on upper end portions of a pair of longitudinally extending side surfaces of the battery 9.

Each of the front and rear mounting parts 61, 66 is configured correspondingly to the battery 9 having the above-described structure. More specifically, each of the front and rear mounting parts 61, 66 is configured such that an upper end portion of the battery 9 is mounted on a lower side of the mounting part in a state in which the battery 9 is partly exposed. More specifically, each of the front and rear mounting parts 61, 66 has a hook engagement part 601, a pair of guide rails 603 and a battery connection terminal 605.

The hook engagement part 601 is an upwardly recessed portion and is configured to engage with the hook 91 of the battery 9. The pair of guide rails 603 extend linearly in the right-left direction and are configured to slidably engage with the pair of guide grooves 93 of the battery 9. The battery connection terminal 605 is configured to be electrically connected to the terminal of the battery 9 when the battery 9 is mounted to the front mounting part 61 or the rear mounting part 66 along with engagement of the hook 91 with the hook engagement part 601.

Further, in the present embodiment, each of the front and rear mounting parts 61, 66 is configured such that the battery 9 is slid from the left side of the hammer drill 101 to the right with the hook 91 on the left and with the guide grooves 93 engaged with the guide rails 603. For this purpose, the hook engagement part 601 is arranged in a left end portion of each of the front and rear mounting parts 61, 66, and the battery connection terminal 605 is configured to be connected to the terminal of the battery 9 from the right side. Further, when the two batteries 9 are mounted to the battery mounting part 6, the lower surfaces of the two batteries 9 are flush with each other. As shown in FIG. 2, the length of the battery 9 in its longitudinal direction (the right-left direction) is longer than the length of the housing 10 (the lower part 136) in the right-left direction. Therefore, right and left ends of the battery 9 mounted to the battery mounting part 6 protrude from the lower part 136 in the right-left direction.

Further, as shown in FIG. 1, a battery protection part 7 is provided to an outer surface portion of the lower part 136. The battery protection part 7 is configured to protect at least one corner region 90 of a lower end portion of the exposed portion of the battery 9 against external force when the battery 9 is mounted on the battery mounting part 6. The structure of the battery protection part 7 is now described in detail.

In the present embodiment, the battery protection part 7 includes a front protection part 71 and a rear protection part 76 which are respectively formed on opposite sides of the battery mounting part 6 in the front-rear direction. The front and rear protection parts 71, 76 are each formed as a portion of the housing 10 (the lower part 136). More specifically, the front and rear protection parts 71, 76 are portions of the lower part 136 that protrude downward relative to the battery mounting part 6, on the opposite sides of the battery mounting part 6. As shown in FIGS. 1 and 2, the front and rear protection parts 71, 76 are configured such that lower surfaces of the protection parts 71, 76 are generally flush in the up-down direction with the lower surfaces of the batteries 9 mounted to the battery mounting part 6. Further, as shown in FIG. 2, the front and rear protection parts 71, 76 have generally the same length as the motor housing part 111 and the upper part 133 in the right-left direction.

In the present embodiment, an upper end portion of the battery 9 is mounted on the battery mounting part 6, and a lower end portion of the battery 9 is exposed below the battery mounting part 6. The battery 9 having a generally rectangular parallelepiped shape has four corner regions 90 (two on the right and left front sides and two on the right and left rear sides) in its lower end portion. Two batteries 9 are mounted side by side in the front-rear direction on the battery mounting part 6, and therefore there exist eight corner regions 90 as a whole.

Among these eight corner regions 90, two corner regions 90 in the rear lower end portion of the battery 9 mounted on the front mounting part 61 (hereinafter simply referred to as a front battery 9) and two corner regions 90 in the front lower end portion of the battery 9 mounted on the rear mounting part 66 (hereinafter simply referred to as a rear battery 9) are located between the two batteries 9 mounted side by side in the front-rear direction. Therefore, these corner regions 90 are less liable to be subjected to external force. Compared with these corner regions 90, two corner regions 90 in the front lower end portion of the front battery 9 and two corner regions 90 in the rear lower end portion of the rear battery 9 are more liable to be subjected to external force, because there are few parts which interfere with the external force around these corner regions 90. Therefore, the front and rear protection parts 71, 76 are provided to protect these corner regions 90 that are more liable to be subjected to the external force.

Specifically, the front protection part 71 is configured to protect the two corner regions 90 of the front lower end portion of the front battery 9 against the external force. The rear protection part 76 is configured to protect the two corner regions 90 of the rear lower end portion of the rear battery 9 against the external force. More specifically, the front protection part 71 serves to protect the two corner regions 90 of the front lower end portion of the front battery 9 by interfering with the external force applied mainly from the front (including diagonally front) of the front protection part 71 toward these two corner regions 90. The rear protection part 76 serves to protect the two corner regions 90 of the rear lower end portion of the rear battery 9 by interfering with the external force applied mainly from the rear (including diagonally rear) of the rear protection part 71 toward these two corner regions 90.

It is noted that the two batteries 9 mounted side by side in the front-rear direction can be regarded as one battery group 900 having a generally rectangular parallelepiped shape as a whole. In this case, it can be said that the battery group 900 has four corner regions 90 (the two corner regions 90 in the front lower end portion of the battery 9 mounted to the front mounting part 61 and the two corner regions 90 in the rear lower end portion of the battery 9 mounted to the rear mounting part 66). Therefore, it can also be said that the front protection part 71 is configured to protect the two corner regions 90 of the front lower end portion of the battery group 900 mounted to the battery mounting part 6 against the external force, while the rear protection part 76 is configured to protect the two corner regions 90 of the rear lower end portion of the battery group 900 against the external force. In other words, it can be said that the battery protection part 7 is configured to protect all of the corner regions 90 of the lower end portion of the battery group 900 against the external force.

Furthermore, the rear protection part 76 is configured to effectively protect the corner regions 90 against impact of dropping, in particular. Specifically, the following relationship is established concerning the rear protection part 76. First, a center of gravity of the hammer drill 101 (including the auxiliary handle which is not shown) having the two batteries 9 mounted to the battery mounting part 6 is defined as a center of gravity G. A virtual line connecting the center of gravity G and each corner region 90 of the rear lower end portion of the rear battery 9 (the rear lower end portion of the battery group 900) is then defined. Further, a virtual plane that is perpendicular to the virtual line and that passes through the corner region 90 is defined. The rear protection part 76 is configured to protrude in a direction away from the center of gravity G, from each virtual plane for each corner region 90.

Generally, there may be a case in which the hammer drill 101 drops with the batteries 9 mounted thereto and in such a posture or state that the center of gravity G is located right above one of the corner regions 90 (in other words, the entire weight of the hammer drill 101 acts on the corner region 90). In such a case, when the corner region 90 collides with the ground or floor in this state, large impact may be applied to the corner region 90 and the risk of damage to the battery 9 may increase. As a countermeasure, the rear protection part 76 is formed to protrude from each of the above-described virtual planes, so that even if the hammer drill 101 drops in the state that the center of gravity G is located right above either one of the two corner regions 90 of the rear lower end portion, the rear protection part 76 may first come in contact with the ground or floor. Therefore, the rear protection part 76 can effectively protect the corner region 90.

It is noted that the front protection part 76 is not formed to protrude from virtual planes that are perpendicular to virtual lines connecting the center of gravity G and corner regions 90 of the front lower end portion of the front battery 9 (the front lower end portion of the battery group 900), respectively, and that pass through the corner regions 90, respectively. The lower surface of the front battery 9, however, protrudes from the virtual planes. Therefore, if the hammer drill 101 drops in the state that the center of gravity G is located right above either one of the corner regions 90 of the front lower end portion, the lower surface of the front battery 9 may first come in contact with the ground or floor and thereby protect the corner region 90 which is more liable to be damaged.

As described above, in the present embodiment, the battery mounting part 6 is provided to the housing 10 of the hammer drill 101 on the opposite side from the working axis A1 across the motor 2 in the extending direction (the up-down direction) of the rotation axis A2 of the motor 2. The battery mounting part 6 is configured such that the two batteries 9 can be removably mounted thereon side by side in the front-rear direction. Further, the battery protection part 7 is provided to the outer surface portion of the housing 10 and includes the front and rear protection parts 71, 76 respectively arranged on the opposite sides of the battery mounting part 6 in the front-rear direction.

When the upper end portion of the battery 9 is mounted to the battery mounting part 6, the corner regions 90 of the lower end portion of the battery 9 are exposed to the outside and are more liable to be damaged by the external force than the other regions. Especially in a structure in the present embodiment in which the two batteries 9 are mounted side by side in the front-rear direction, the two corner regions 90 of the front lower end portion of the front battery 9 and the two corner regions 90 of the rear lower end portion of the rear battery 9 are liable to be subjected to the external force and thus liable to be damaged. As countermeasures, the front and rear protection parts 71, 76 are provided to protect these corner regions 90 against the external force and reduce the risk of damage to the batteries 9. Further, the rear protection part 76 having the above-described relation with the virtual planes can effectively protect the two corner regions 90 of the rear lower end portion of the rear battery 9 against the impact caused by dropping.

Further, in the present embodiment, the battery protection part 7 (the front and rear protection parts 71, 76) is formed by portions of the housing 10. Therefore, the battery protection part 7 can be easily formed without increasing the number of parts. Further, the battery protection part 7 (the front and rear protection parts 71, 76) is configured such that its lower surfaces are generally flush with the lower surfaces of the batteries 9 mounted to the battery mounting part 6 (the front and rear mounting parts 61, 66). Therefore, the hammer drill 101 can be placed on the ground or floor in a stable posture with the lower surfaces of the battery protection part 7 and the batteries 9 as placing surfaces.

In the present embodiment, the hammer drill 101 is an example that corresponds to the "power tool" according to the present teachings. The motor 2 is an example that corresponds to the "motor" according to the present teachings. The housing 10 is an example that corresponds to the "housing" according to the present teachings. The battery mounting part 6 is an example that corresponds to the "battery mounting part" according to the present teachings. The battery 9 and the corner region 90 are examples that correspond to the "battery" and the "corner region", respectively, according to the present teachings. The battery protection part 7 is an example that corresponds to the "battery protection part" according to the present teachings. The front protection part 71 and the rear protection part 76 are examples that correspond to the "front protection part" and the "rear protection part", respectively, according to the present teachings.

Second Embodiment

A hammer drill 102 according to a second embodiment is now described with reference to FIGS. 3 and 4. The hammer drill 102 of the second embodiment has substantially the same structure as the hammer drill 101 of the first embodiment, except for the structures of a lower part 137 and a battery protection part 70. Therefore, structures which are substantially identical to those in the first embodiment are not shown in the drawings and not described, and the different structures are mainly described with reference to the drawings. The same applies to the third embodiment and subsequent embodiments.

Figure 3:
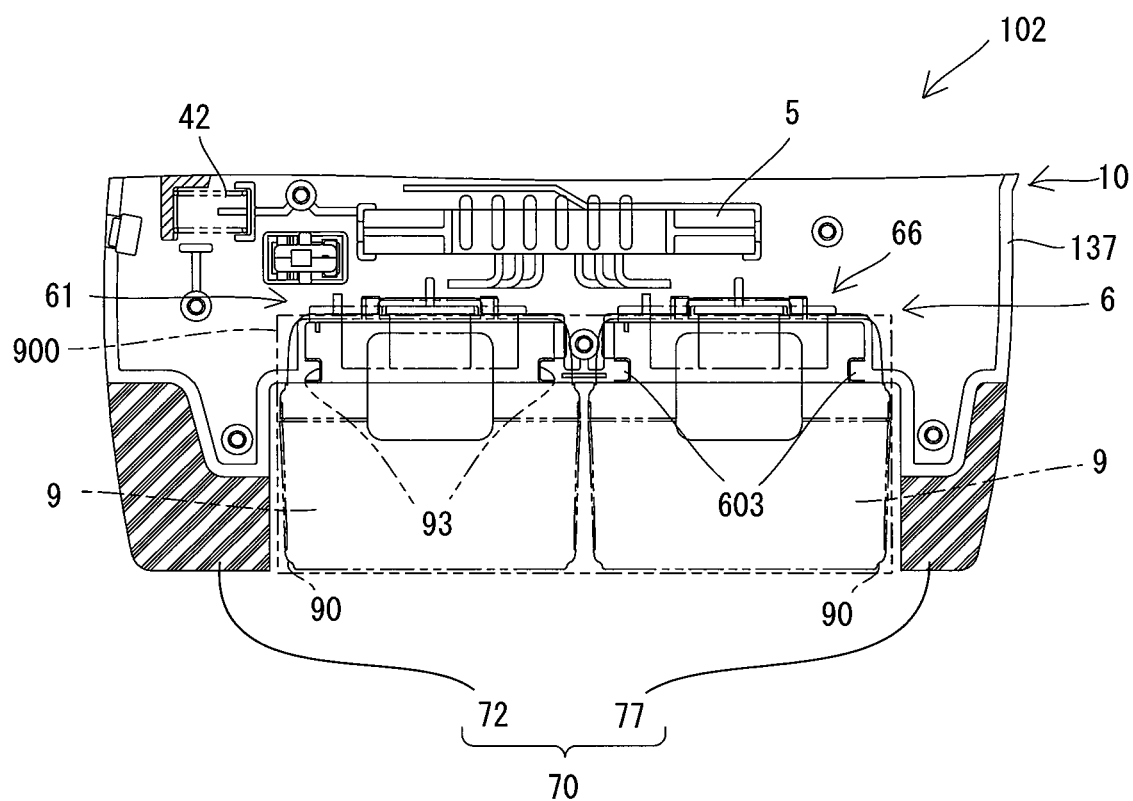
FIG. 3 is a longitudinal sectional view of a portion of a hammer drill according to an embodiment.
Figure 4:
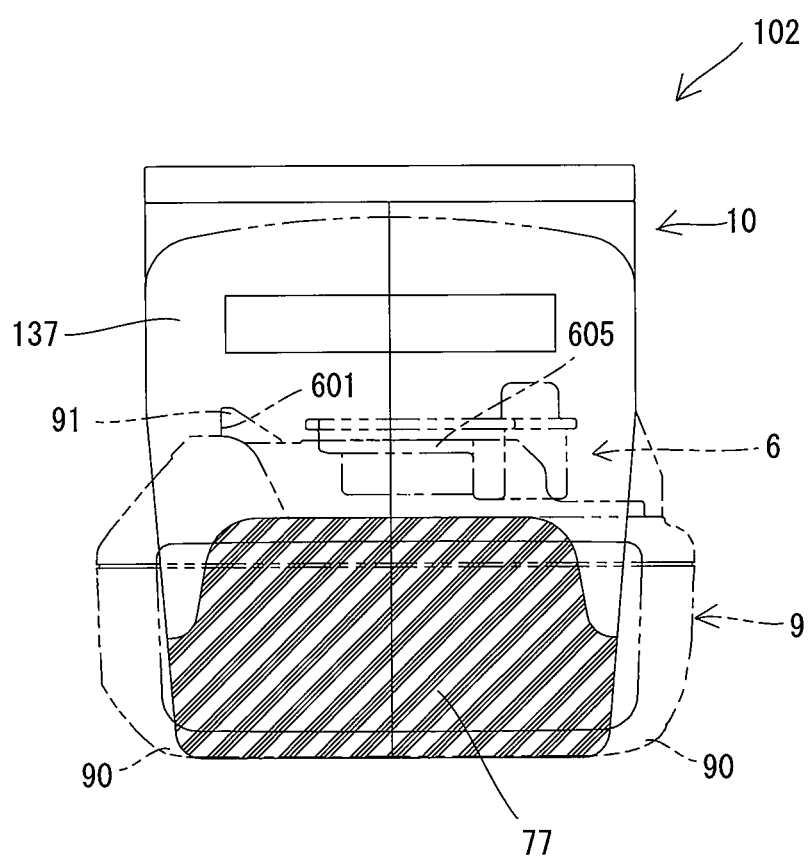
FIG. 4 is a rear view of a portion of the hammer drill.

As shown in FIGS. 3 and 4, a battery protection part 70 of the present embodiment includes a front protection part 72 and a rear protection part 77 like in the first embodiment. Unlike in the first embodiment, however, the battery protection part 70 is formed as a separate member from the housing 10 including the lower part 137, and mounted to the lower part 137. Portions of the lower part 137 on the front and rear sides of the battery mounting part 6 respectively protrude downward. The front and rear protection parts 72, 77 are mounted to cover these protruding portions. In the present embodiment, the front and rear protection parts 72, 77 are formed of a different material from the housing 10. More specifically, in the present embodiment, the housing 10 is formed of a polyamide resin in consideration of weight reduction and rigidity, while the battery protection part 70 is formed of rubber in consideration of impact absorption. The battery protection part 70 is mounted to the housing 10 by integral molding.

The outer shape of the lower part 137 with the battery protection part 70 mounted thereto is generally the same as the outer shape of the lower part 136 including the battery protection part 7 of the first embodiment. Therefore, like in the first embodiment, the front and rear protection parts 72, 77 are configured such that their lower surfaces are generally flush with the lower surfaces of the batteries 9 mounted to the battery mounting part 6. Further, the rear protection part 77 is configured to protrude in a direction away from the center of gravity G (see FIG. 1) from each virtual plane that is perpendicular to a virtual line connecting the center of gravity G and each corner region 90 of the rear lower end portion of the rear battery 9 and that passes through the corner region 90.

In the battery protection part 70 having the above-described structure according to the present embodiment, the front and rear protection parts 72, 77 can respectively protect the two corner regions 90 of the front lower end portion of the front battery 9 and the two corner regions 90 of the rear lower end portion of the rear battery 9 against external force and reduce the risk of damage to the batteries 9. Further, even if the hammer drill 102 drops in the state that the center of gravity G is located right above either one of the two corner regions 90 of the rear lower end portion of the rear battery 9, the corner region 90 can be effectively protected against impact of dropping.

Further, in the present embodiment, the battery protection part 70 is formed of a different material as a separate member from the housing 10, and mounted to the housing 10 by integral molding. In this manner, by forming the battery protection part 70 as a separate member, the battery protection part 70 can be properly mounted to the housing 10 while the housing 10 is kept in a simple shape. Further, the housing 10 and the battery protection part 70 can be formed of respectively appropriate materials. Further, in a structure in the present embodiment in which the battery protection part 70 is formed as a separate member from the housing 10, the battery protection part 70 may preferably be formed of a material having a smaller modulus of elasticity than that of the housing 10. In this case, the battery protection part 70 may preferably be formed of an elastic material, which is not limited to rubber.

In the present embodiment, the battery protection part 70 is an example that corresponds to the "battery protection part" according to the present teachings. The front protection part 72 and the rear protection part 77 are examples that correspond to the "front protection part" and the "rear protection part", respectively, according to the present teachings.

Third Embodiment

A hammer drill 103 according to a third embodiment is now described with reference to FIG. 5. The hammer drill 103 of the third embodiment has substantially the same structure as the hammer drill 101 (see FIG. 1) of the first embodiment except for the structures of a lower part 138 and a battery protection part 700.

Figure 5:
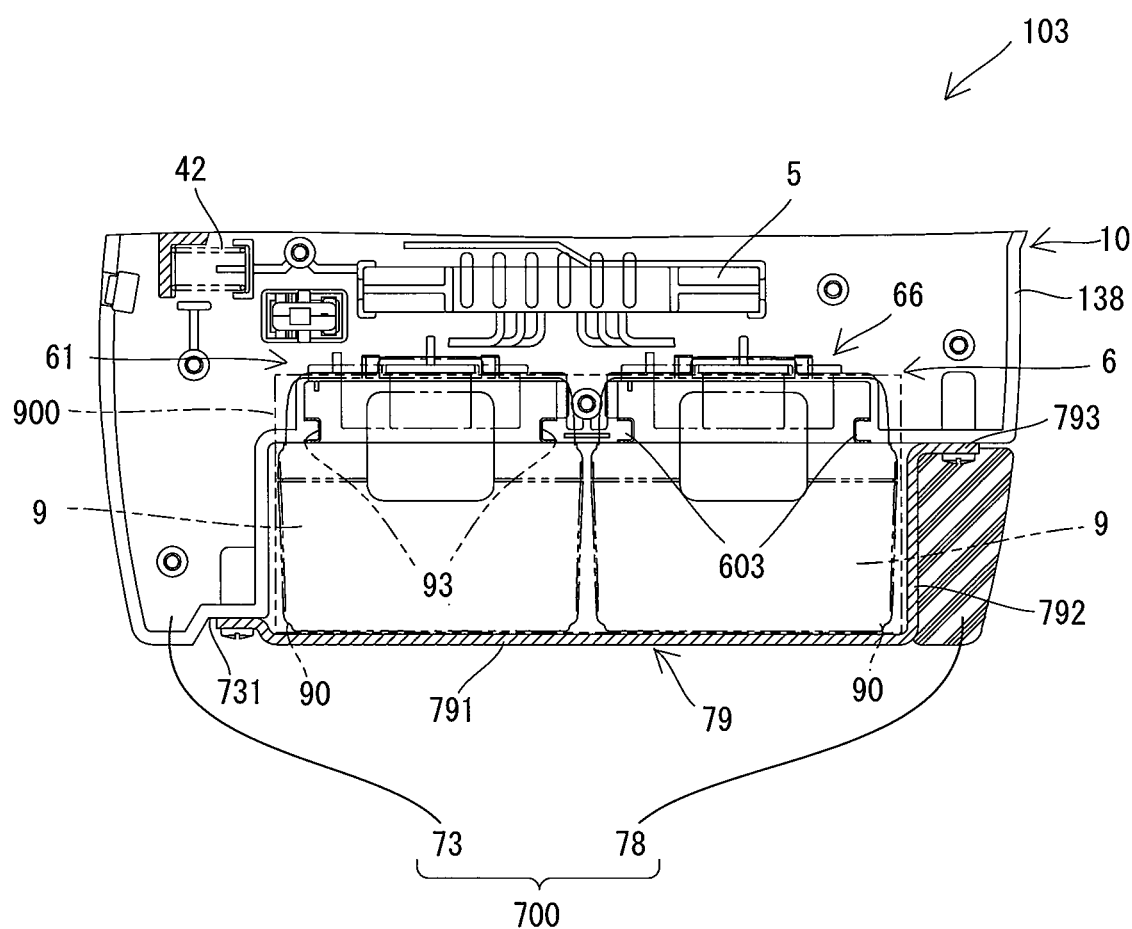
FIG. 5 is a longitudinal sectional view of a portion of a hammer drill according to an embodiment.

As shown in FIG. 5, in the present embodiment, a front end portion of the lower part 138 of the housing 10 protrudes downward relative to the battery mounting part 6. A rear portion of a lower surface of the protruding front end portion of the lower part 138 is formed as a stepped part 731 that is slightly recessed upward with respect to a front portion of the lower surface. A lower surface of a rear end portion of the lower part 138 is formed generally at the same level as the guide rails 603.

A covering member 79 is fixed below the battery mounting part 6. The covering member 79 is formed by bending a generally rectangular metal plate into a generally L-shape in a side view. The covering member 79 includes a lower surface part 791, a side surface part 792, and an upper surface part 793. The lower surface part 791 extends in a direction substantially perpendicular to the rotation axis A2 of the motor 2. The side surface part 792 extends from a rear end of the lower surface part 791 in a direction substantially perpendicular to the lower surface part 791. The upper surface part 793 extends from an upper end of the side surface part 792 in a direction substantially perpendicular to the side surface part 792. A front end portion of the lower surface part 791 is fixed to the stepped part 731 of a front protection part 73 from below with screws. The upper surface part 793 is fixed to the rear end portion of the lower part 138 from below with screws. With such a structure, a battery housing space having a rectangular shape in a side view and opened in the right-left direction is defined between the battery mounting part 6 and the covering member 79.

When the guide grooves 93 are slid from the left side of the hammer drill 103 to the right in engagement with the guide rails 603, the battery 9 can be mounted on the battery mounting part 6 and disposed within the battery housing space. At this time, the batteries 9 are arranged such that the lower surface part 791 faces lower surfaces of the batteries 9 and the side surface part 792 faces a rear end surface of the battery 9 mounted on the rear mounting part 66. It is noted that the battery housing space is open to the left, so that the batteries 9 can be mounted to and removed from the battery mounting part 6 even when the covering member 79 is fixed.

The battery protection part 700 of the present embodiment includes the front protection part 73 and a rear protection part 78 which are respectively formed on opposite sides of the battery mounting part 6 in the front-rear direction. The front protection part 73 and the rear protection part 78 havestructures corresponding to the front protection part 71 of the first embodiment and the rear protection part 77 of the second embodiment, respectively.

Specifically, the front protection part 73 of the battery protection part 700 is formed as a portion of the lower part 138, while the rear protection part 78 is formed of rubber and formed as a separate member from the housing 10 and mounted to the lower part 138. The front protection part 73 is formed by the front end portion of the lower part 138 which protrudes downward relative to the battery mounting part 6, as described above. The rear protection part 78 is bonded to a rear side of the side surface part 792 of the covering member 79 and to a lower side of the rear end portion of the lower part 138, after the covering member 79 is fixed to the lower part 138. The front protection part 73 and the rear protection part 78 are configured such that their lower surfaces are generally flush with the lower surface part 791 of the covering member 79. Like in the first and second embodiments, right and left ends of the battery 9 mounted to the battery mounting part 6 protrude from the battery protection part 700 in the right-left direction (see FIG. 2).

Further, the rear protection part 78 is configured to protrude in a direction away from the center of gravity G (see FIG. 1) from each virtual plane that is perpendicular to a virtual line connecting the center of gravity G and each corner region 90 of the rear lower end portion of the rear battery 9 and that passes through the corner region 90.

In the battery protection part 700 having the above-described structure according to the present embodiment, the front and rear protection parts 73, 78 can respectively protect the two corner regions 90 of the front lower end portion of the front battery 9 and the two corner regions 90 of the rear lower end portion of the rear battery 9 against external force and reduce the risk of damage to the batteries 9. Further, even if the hammer drill 103 drops in the state that the center of gravity G is located right above either one of the two corner regions 90 of the rear lower end portion of the rear battery 9, the rubber rear protection part 78 can particularly effectively protect the corner region 90 against impact of dropping.

Furthermore, with the structure that the lower surfaces of the battery protection part 700 and the lower surface of the covering member 79 (the lower surface part 791) are flush with each other, the hammer drill 103 can be placed on the ground or floor in a stable posture with the lower surfaces of the battery protection part 700 and the covering member 79 as placing surfaces, regardless whether the batteries 9 are mounted or not. Further, the covering member 79 can protect the batteries 9 by interfering with external force applied mainly from below (including diagonally below) the batteries 9 toward the batteries 9.

In the present embodiment, the battery protection part 700 is an example that corresponds to the "battery protection part" according to the present teachings. The front protection part 73 and the rear protection part 78 are examples that correspond to the "front protection part" and the "rear protection part", respectively, according to the present teachings.

Fourth Embodiment

A hammer drill 104 according to a fourth embodiment is now described with reference to FIGS. 6 and 7. The hammer drill 104 of the present embodiment has substantially the same structure as the hammer drill 101 (see FIG. 1) of the first embodiment except for the structures of a lower part 139 and a battery protection part 8.

Figure 6:
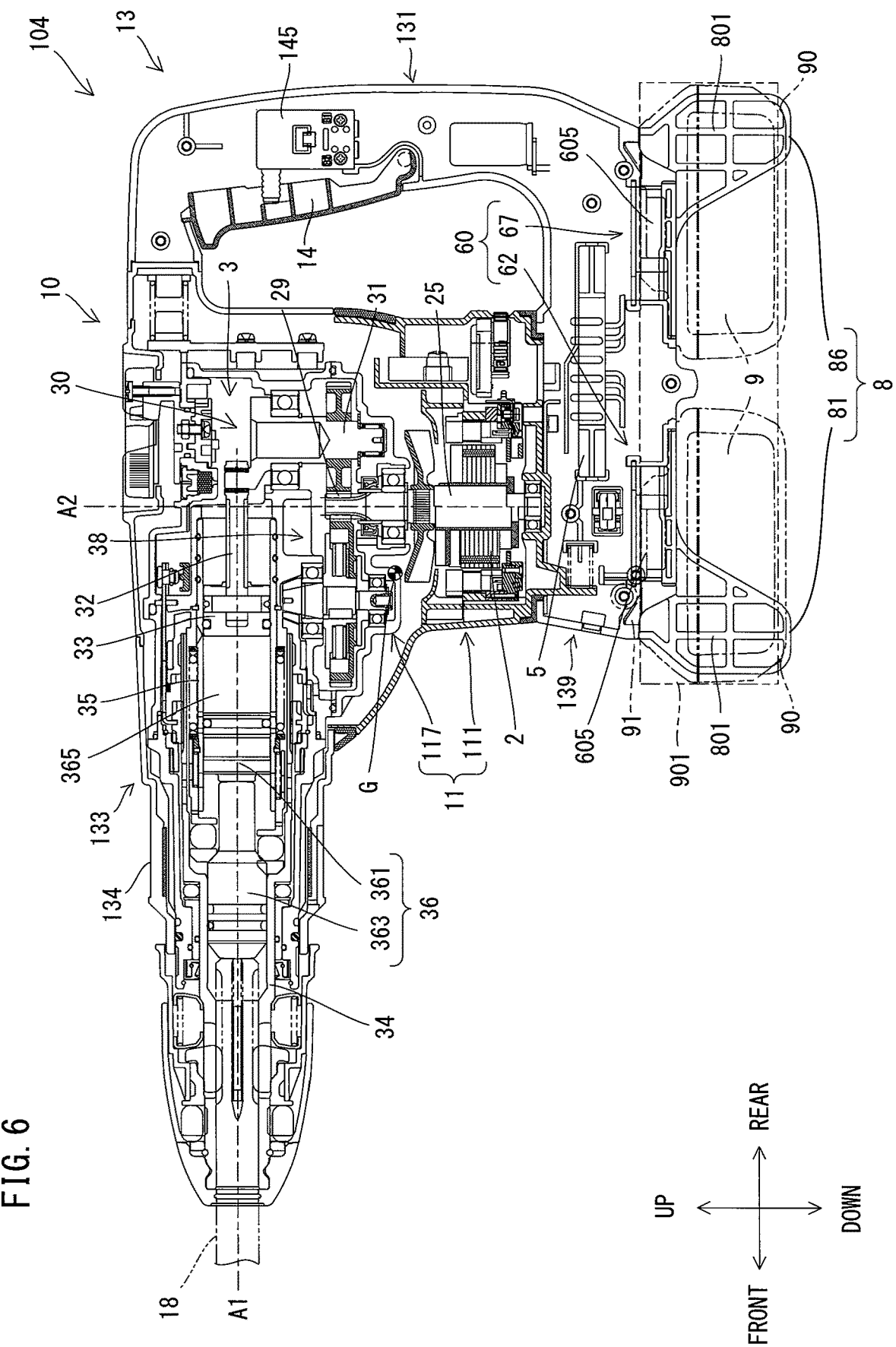
FIG. 6 is a longitudinal sectional view of a hammer drill according to an embodiment.

As shown in FIG. 6, the hammer drill 104 of the present embodiment includes a housing 10, a motor 2, a battery mounting part 60, and a battery protection part 8. The motor 2 is housed in the housing 10. The battery mounting part 60 are configured such that two batteries 9 can be removably mounted to the battery mounting part 60. The battery protection part 8 is provided to the outer surface portion of the housing 10. The housing 10 includes a first housing 11, which houses the motor 2 and the driving mechanism 3, and a second housing 13, which is elastically connected to the first housing 11.

The lower part 139 of the second housing 13 is arranged below the motor 2. The lower part 139 has a battery mounting part 60 on its lower end portion. In the present embodiment, the battery mounting part 60 includes a front mounting part 62 formed in a front portion of the lower end portion of the lower part 139, and a rear mounting part 67 formed in a rear portion of the lower end portion of the lower part 139.

Figure 7:
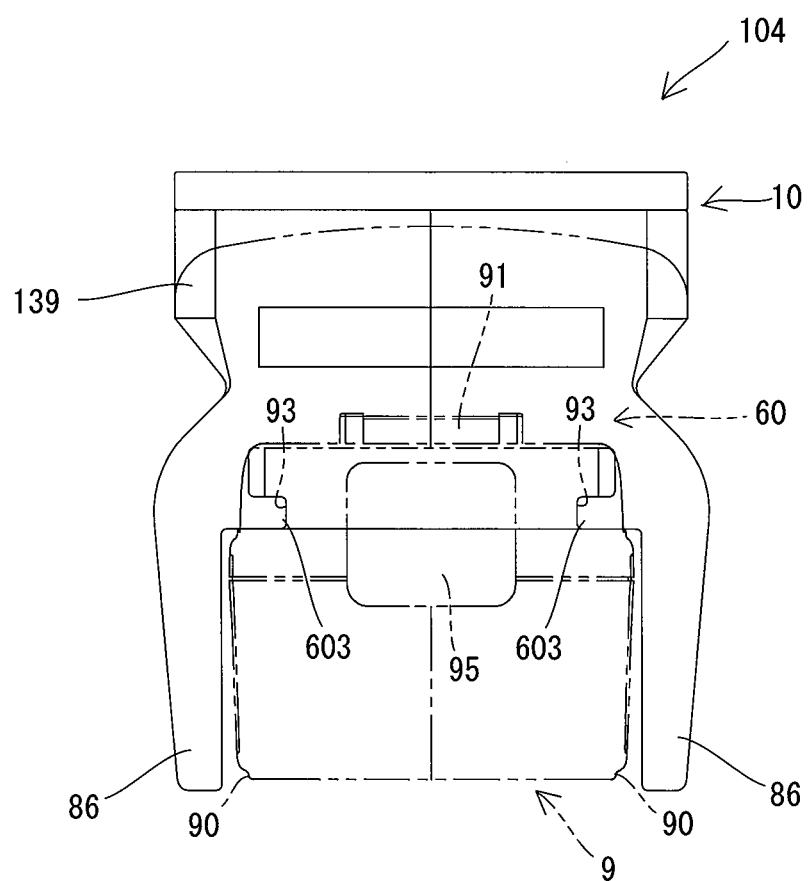
FIG. 7 is a rear view of a portion of the hammer drill.

As shown in FIGS. 6 and 7, the front and rear mounting parts 62, 67 have the same structure. Each of the front and rear mounting parts 62, 67 has the hook engagement part 601, the pair of guide rails 603 and the battery connection terminal 605, like in the first embodiment. Unlike in the first embodiment, however, the front mounting part 62 is configured such that the battery 9 can be mounted from the front and the rear mounting part 67 is configured such that the battery 9 can be mounted from the rear. Specifically, the guide rails 603 of the front and rear mounting parts 62, 67 extend in the front-rear direction. Further, in the front mounting part 62, the hook engagement part 601 is provided in its front end portion. The battery connection terminal 605 is configured to be connected to the terminal of the battery 9 from the rear. In the rear mounting part 67, the hook engagement part 601 is provided in its rear end portion. The battery connection terminal 605 is configured to be connected to the terminal of the battery 9 from the front.

In the present embodiment, the battery protection part 8 includes a pair of front protection parts 81 provided to a front end portion of the lower part 139 and a pair of rear protection parts 86 provided to a rear end portion of the lower part 139. The front and rear protection parts 81, 86 are formed by portions of the lower part 139. Specifically, each of the front protection parts 81 is formed like a thin plate. The pair of front protection parts 81 are arranged to face each other in the right-left direction across a front region of the front mounting part 62, and to protrude downward relative to the front mounting part 62. Each of the rear protection parts 86 is formed like a thin plate. The pair of rear protection parts 86 are arranged to face each other in the right-left direction across a rear region of the rear mounting part 67, and to protrude downward relative to the rear mounting part 62. It is noted that reinforcing ribs 801 are formed on opposing surfaces of the front and rear protection parts 81, 86, respectively. When the batteries 9 are mounted to the battery mounting part 60, the front protection parts 81 are located on the right and left sides of a front end portion of the front battery 9 and the rear protection parts 86 are located on the right and left sides of a rear end portion of the rear battery 9.

In the present embodiment, the front and rear protection parts 81, 86 are configured to slightly protrude downward relative to the lower surfaces of the batteries 9 when the batteries 9 are mounted to the battery mounting part 60, and such that the lower surfaces of the front and rear protection parts 81, 86 are generally flush with each other.

Further, in the present embodiment, the following relationship is established. A center of gravity of the hammer drill 104 (including the auxiliary handle) having the batteries 9 mounted to the battery mounting part 60 is defined as a center of gravity G. Then, virtual lines are defined, one of which connects the center of gravity G and the right corner region 90 of a front lower end portion of the front battery 9 (a front lower end portion of a battery group 901), and the other of which connects the center of gravity G and the left corner region 90 of the front lower end portion of the front battery 9. Further, virtual planes are defined that are perpendicular to the virtual lines, respectively, and that pass these corner regions 90, respectively. The right and left pair of front protection parts 81 are configured to protrude, in directions away from the center of gravity G, from the respective virtual planes. Similarly, virtual lines are defined, one of which connects the center of gravity G and the right corner region 90 of a rear lower end portion of the rear battery 9 (a rear lower end portion of the battery group 901), and the other of which connects the center of gravity G and the left corner region 90 of the rear lower end portion of the rear battery 9. Further, virtual planes are defined that are perpendicular to the virtual lines, respectively, and that pass these corner regions 90, respectively. The right and left pair of rear protection parts 86 are configured to protrude, in directions away from the center of gravity G from the respective virtual planes.

In the battery protection part 8 having the above-described structure according to the present embodiment, the pair of front protection parts 81 can protect the two corner regions 90 of the front lower end portion of the front battery 9 by interfering with external force applied mainly from the left or right side (including diagonally left or right side) of the front protection parts 81 toward the corner regions 90. The rear protection parts 86 can protect the two corner regions 90 of the rear lower end portion of the rear battery 9 by interfering with external force applied mainly from the left or right side (including diagonally left or right side) of the rear protection parts 86 toward the corner regions 90. Thus, the risk of damage to the batteries 9 can be reduced. Further, even if the hammer drill drops in the state that the center of gravity G is located right above either one of the four corner regions 90 of the lower end portion of the battery group 901, the front and rear protection parts 81, 86 can effectively protect the corner region 90 against impact of dropping.

Further, the pair of front protection part 81 and the pair of rear protection parts 86 are arranged at four positions as a whole such that they surround the battery group 901. Therefore, the hammer drill 104 can be placed on the ground or floor in a stable posture with the lower surfaces of the front and rear protection parts 81, 86 as placing surfaces.

In the present embodiment, the battery protection part 8 is an example that corresponds to the "battery protection part" according to the present teachings. The pair of front protection parts 81 and the pair of rear protection parts 86 are examples that correspond to the "pair of front protection parts" and the "pair of rear protection parts", respectively, according to the present teachings.

Fifth Embodiment

A hammer drill 105 according to a fifth embodiment is now described with reference to FIG. 8. The hammer drill 105 of the present embodiment corresponds to a modification made by providing a wireless interlock unit 711 within the battery protection part 7 of the hammer drill 101 (see FIG. 1) of the first embodiment.

Figure 8:
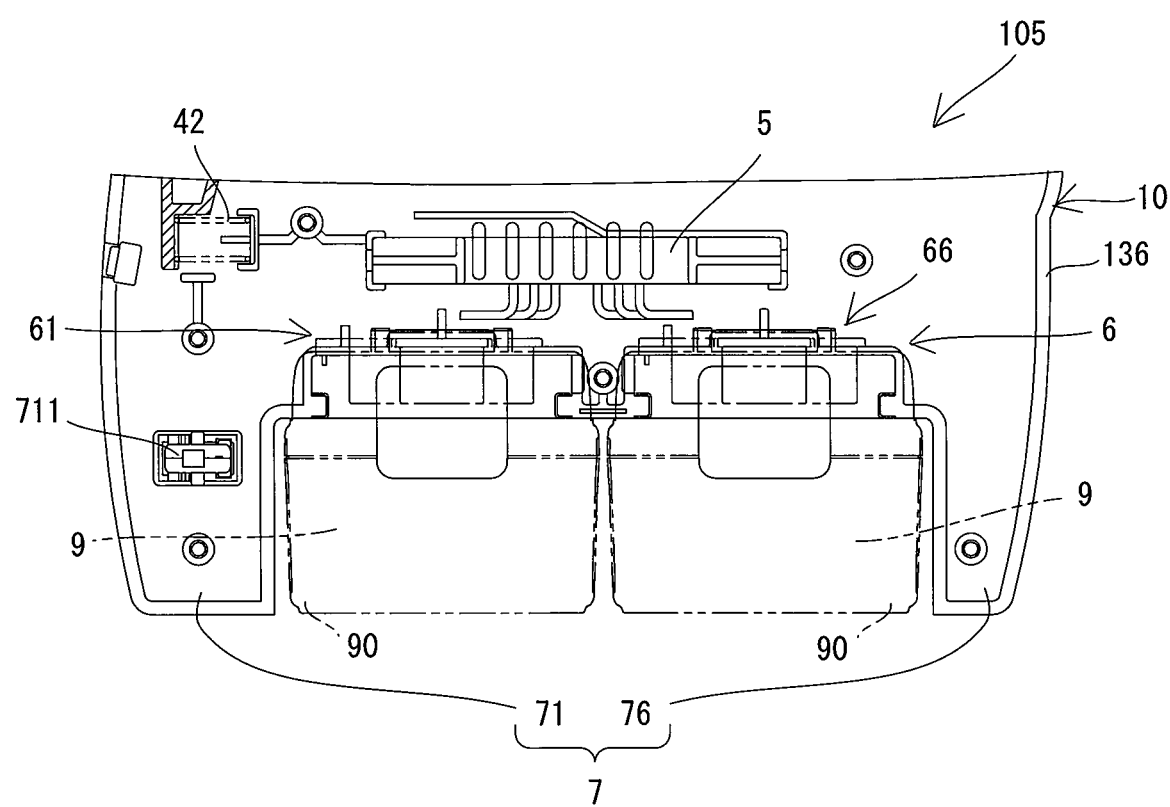
FIG. 8 is a longitudinal sectional view of a portion of a hammer drill according to an embodiment.

As shown in FIG. 8, as in the first embodiment, the battery protection part 7 of the present embodiment includes the front protection part 71 and the rear protection part 76. The front and rear protection parts 71, 76 are formed as portions of the housing 10 (the lower part 136). The front and rear protection parts 71, 76 extend downward relative to the battery mounting part 6, on the front and rear sides of the battery mounting part 6. With such a structure, internal spaces, which are free spaces, are formed within the front and rear protection parts 71, 76. Therefore, in the present embodiment, the wireless interlock unit 711 is disposed in the internal space of the front protection part 71.

The wireless interlock unit 711 is an additional mechanism having a different function from protection of the corner region 90 of the battery 9. Specifically, the wireless interlock unit 711 is configured to perform wireless communication with an external device. In the present embodiment, the wireless interlock unit 711 is configured to wirelessly transmit a prescribed interlock signal to a stationary dust collector that is separate from the hammer drill 105, according to a control signal from the controller 5, by using radio waves of a prescribed frequency band via an antenna (not shown). Such a system itself is well known and therefore briefly explained. The controller 5 causes the wireless interlock unit 711 to transmit the interlock signal while the trigger 14 (see FIG. 1) is pressed and the switch 145 (see FIG. 1) is in the on state. A controller of the dust collector is configured to drive a motor of the dust collector while the interlock signal is received from the wireless interlock unit 711. Thus, the user of the hammer drill 105 can operate the dust collector in interlock with the hammer drill 105 simply by pressing the trigger 14.

The hammer drill 105 having the above-described structure according to the present embodiment can not only protect the corner regions 90 of the batteries 9 against external force to thereby reduce the risk of damage to the batteries 9, but also realize the function of interlocking with the dust collector by effectively utilizing the internal space of the battery protection part 7. In the present embodiment, the wireless interlock unit 711 is an example that corresponds to the "additional mechanism" according to the present teachings. It is noted that the wireless interlock unit 711 may be disposed in the internal space of the rear protection part 76 rather than the front protection part 71. The wireless interlock unit 711 is not limited to those that transmit an interlock signal to a dust collector, but may be configured to perform wireless communication with a different external device (e.g. a portable terminal).

Sixth Embodiment

A hammer drill 106 according to a sixth embodiment is now described with reference to FIG. 9. The hammer drill 106 of the present embodiment corresponds to a modification made by providing a USB terminal 712 within the battery protection part 7 of the hammer drill 101 (see FIG. 1) of the first embodiment.

Figure 9:
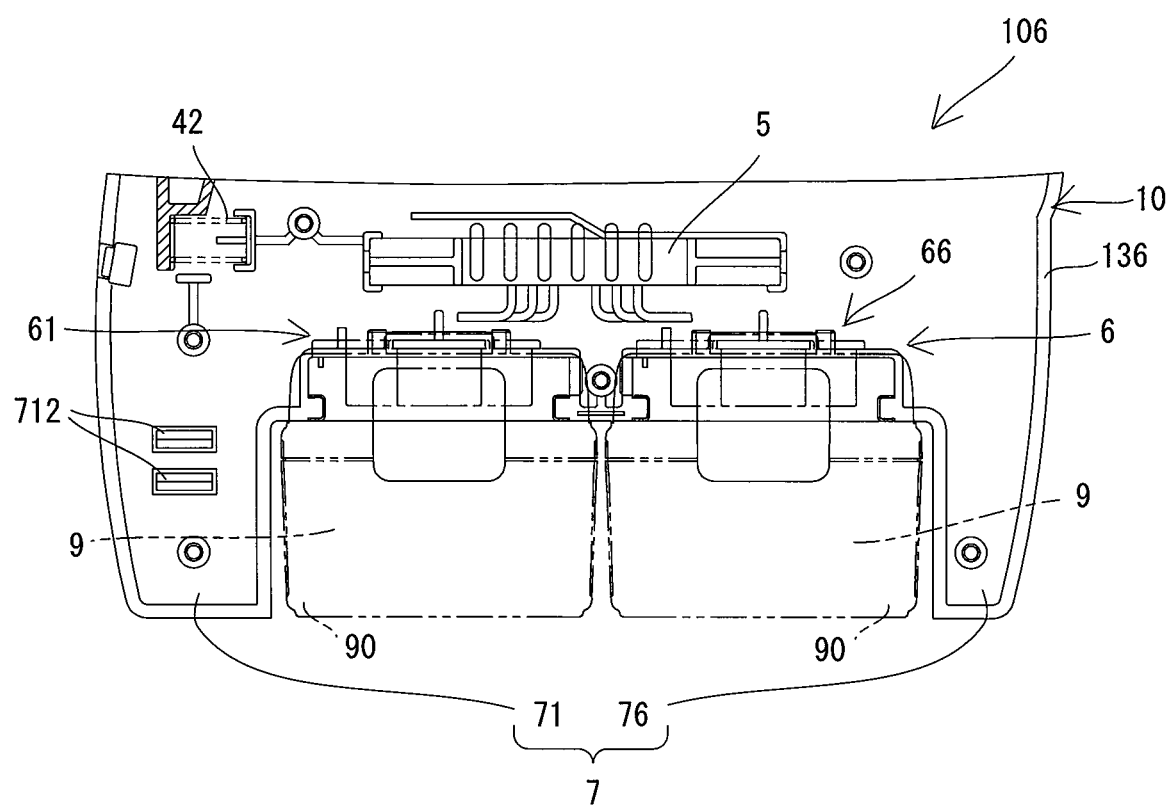
FIG. 9 is a longitudinal sectional view of a portion of a hammer drill according to an embodiment.

As shown in FIG. 9, in the present embodiment as well, the front and rear protection parts 71, 76 are formed as portions of the housing 10 (the lower part 136). The front and rear protection parts 71, 76 extend downward relative to the battery mounting part 6, on the front and rear sides of the battery mounting part 6. In the present embodiment, two USB terminals 712 are disposed in the internal space of the front protection part 71. Each of the USB terminals 712 is an additional mechanism having a different function from protection of the corner region 90 of the battery 9. Specifically, each of the USB terminals 712 is configured to be electrically connectable to an external USB device (e.g. a portable terminal). Thus, for example, the USB device connected via the USB terminal 712 can be charged by utilizing the batteries 9 mounted to the battery mounting part 6.

The hammer drill 106 having the above-described structure according to the present embodiment can not only protect the corner regions 90 of the batteries 9 against external force to thereby reduce the risk of damage to the batteries 9, but also realize the function of supplying power from the batteries 9 to a USB device by effectively utilizing the internal space of the battery protection part 7. It is noted that the USB terminals 712 may be disposed in the internal space of the rear protection part 76 rather than the front protection part 71. The number of the USB terminals 712 may be one, or three or more. A connecting terminal for external devices based on other communication standards may be provided in place of the USB terminal 712. In the present embodiment, the USB terminal 712 is an example that corresponds to the "additional mechanism" according to the present teachings.

Seventh Embodiment

A hammer drill 107 according to a seventh embodiment is now described with reference to FIG. 10. The hammer drill 107 of the present embodiment corresponds to a modification made by providing a distance sensor 713 within the battery protection part 7 of the hammer drill 101 (see FIG. 1) of the first embodiment.

Figure 10:
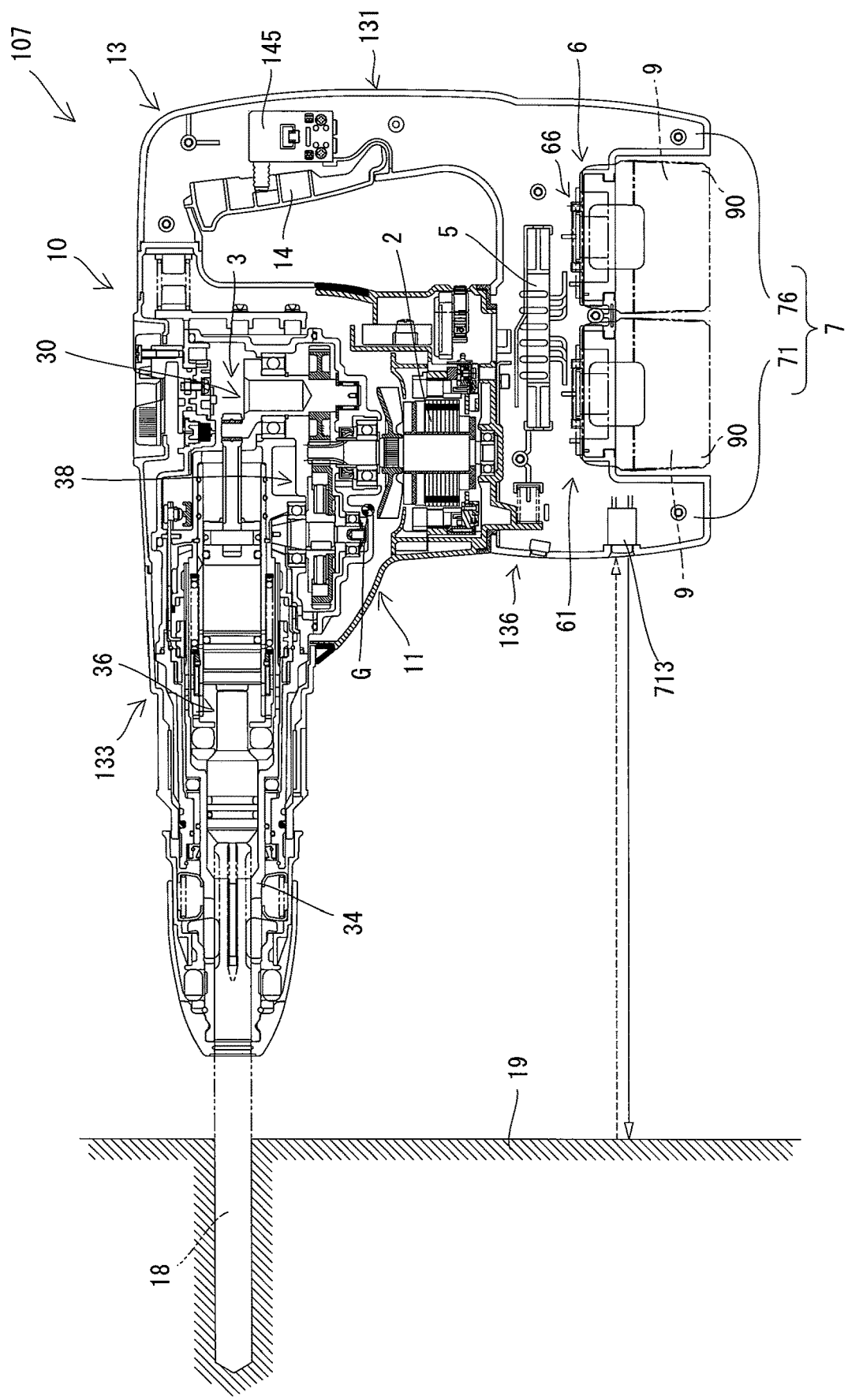
FIG. 10 is a longitudinal sectional view of a hammer drill according to an embodiment.

As shown in FIG. 10, in the present embodiment as well, the front and rear protection parts 71, 76 are formed as portions of the housing 10 (the lower part 136). The front and rear protection parts 71, 76 extend downward relative to the battery mounting part 6, on the front and rear sides of the battery mounting part 6. In the present embodiment, the distance sensor 713 is disposed in the internal space of the front protection part 71. The distance sensor 713 is an additional mechanism having a different function from protection of the corner region 90 of the battery 9. Specifically, the distance sensor 713 is configured to measure a distance from an object located within a prescribed detection range. In the present embodiment, an infrared type distance sensor 713 is provided. The distance sensor 713 is configured to project light of infrared light emitting diode through a through hole formed in a front wall of the front protection part 71 and measure the distance based on the position of light reflected by the object and made incident on a photodetector.

When the hammer drill 107 performs a drilling work on a workpiece 19 through the drilling operation, a difference between the distance to the workpiece 19 which is measured at the beginning of the operation and the distance measured during the operation generally corresponds to the depth of the drilled hole. Therefore, for example, when the calculated depth of the hole reaches a value preset by a user, the controller 5 can stop driving of the motor 2 (see FIG. 1) or provide notification via an LED lamp (not shown), a buzzer or the like.

The hammer drill 107 having the above-described structure according to the present embodiment can not only protect the corner regions 90 of the batteries 9 against external force to thereby reduce the risk of damage to the batteries 9, but also realize the function of measuring the depth of a hole drilled in the drilling operation by effectively utilizing the internal space of the battery protection part 7. It is noted that a method for measuring the distance by the distance sensor 713 is not limited to the above-described method, but any other method may be employed such as an ultrasonic method. In the present embodiment, the distance sensor 713 is an example that corresponds to the "additional mechanism" according to the present teachings.

Eighth Embodiment

A hammer drill 108 according to an eighth embodiment is now described with reference to FIG. 11. The hammer drill 107 of the present embodiment corresponds to a modification made by providing reinforcing members 803, 805 to reinforce the battery protection part 7 of the hammer drill 101 (see FIG. 1) of the first embodiment.

Figure 11:
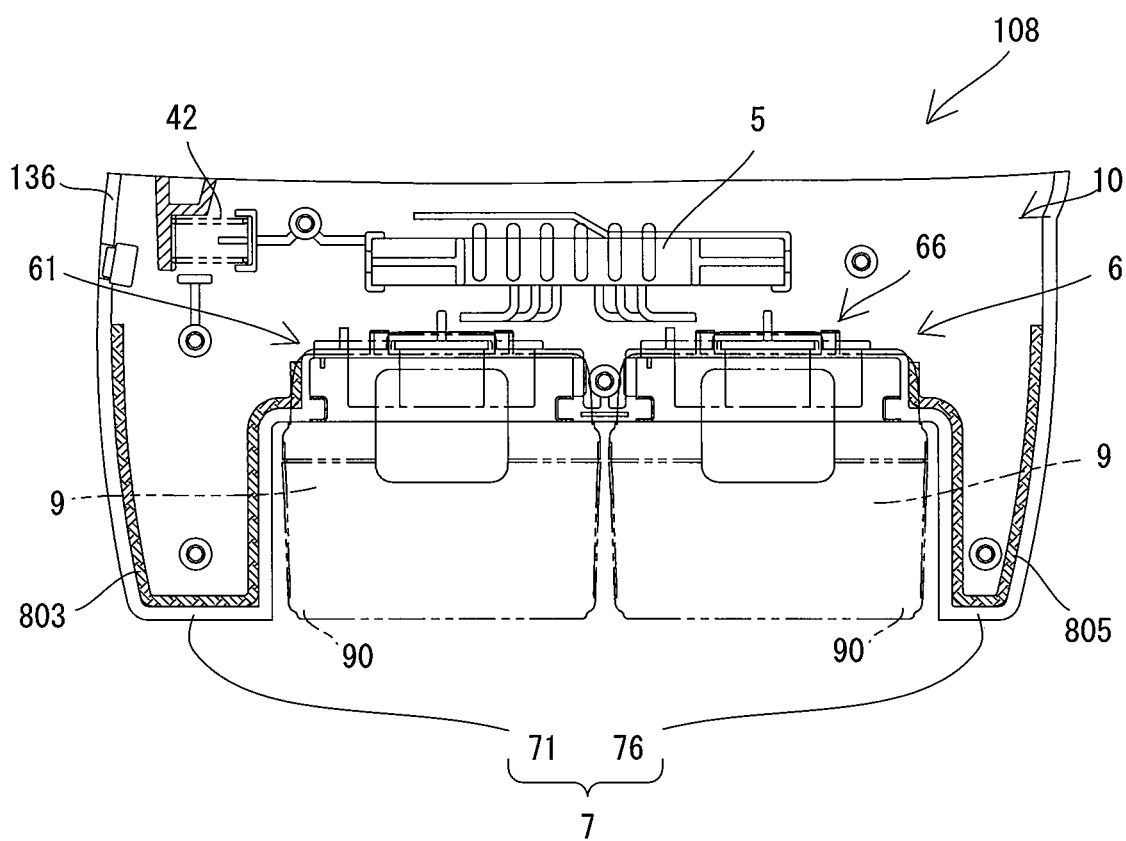
FIG. 11 is a longitudinal sectional view of a portion of a hammer drill according to an embodiment.

As shown in FIG. 11, in the present embodiment as well, the front and rear protection parts 71, 76 are formed as portions of the housing 10 (the lower part 136). The front and rear protection parts 71, 76 extend downward relative to the battery mounting part 6, on the front and rear sides of the battery mounting part 6. In the present embodiment, the metal reinforcing members 803, 805 are respectively provided in the front and rear protection parts 71, 76. More specifically, the reinforcing member 803 is arranged along the inner surfaces of a front wall part (a front wall part of the lower part 136), a bottom wall part and a rear wall part (a wall part extending downward from the front end of the front mounting part 61) of walls of the lower part 136 forming the front protection part 71. Similarly, the reinforcing member 805 is arranged along the inner surfaces of a front wall part (a wall part extending downward from the rear end of the rear mounting part 66), a bottom wall part and a rear wall part (a rear wall part of the lower part 136) of walls of the lower part 136 forming the rear protection part 76. The reinforcing members 803, 805 may be fixed to the front and rear protection parts 71, 76 by any method. In the present embodiment, the reinforcing members 803, 805 are integrally formed with the lower part 136 so as to be fixed to the front and rear protection parts 71, 76.

In the hammer drill 108 having the above-described structure according to the present embodiment, the front and rear protection parts 71, 76 are respectively reinforced by the reinforcing members 803, 805. Therefore, the risk of damage to the front and rear protection parts 71, 76 can be reduced when the front and rear protection parts 71, 76 are subjected to external force. Therefore, the risk of damage to the batteries 9 can be more reliably reduced. In the present embodiment, each of the reinforcing members 803, 805 is an example that corresponds to the "reinforcing member" according to the present teachings.

It is noted that the reinforcing members 803, 805 may be at least partly disposed in the front and rear protection parts 71, 76, respectively. For example, at least a portion of the reinforcing member 803 and at least a portion of the reinforcing member 805 may be respectively fixed to outer surfaces of the front and rear protection parts 71, 76. It is noted that the front and rear protection parts 71, 76 protrude downward relative to the battery mounting part 6. For this reason, in order to reduce a risk that the front and rear protection parts 71, 76 break at their roots, as shown in FIG. 11, it may be preferable that the reinforcing members 803, 805 at least partly extend upward relative to the battery mounting part 6.

Ninth Embodiment

A hammer drill 109 according to a ninth embodiment is now described with reference to FIGS. 12 and 13. The hammer drill 109 of the ninth embodiment has generally the same structure as the hammer drill 101 (see FIG. 1) of the first embodiment, except for the structure of a battery protection part 80. In the above-described embodiments, only the battery 9 having a capacity of 18 volt is described as an example of the battery which can be mounted to the battery mounting part 6, but there exist plural kinds of such batteries varying in capacity and size. Therefore, in the present embodiment, the battery protection part 80 is configured to be compatible with the plural kinds of batteries.

Figure 12:
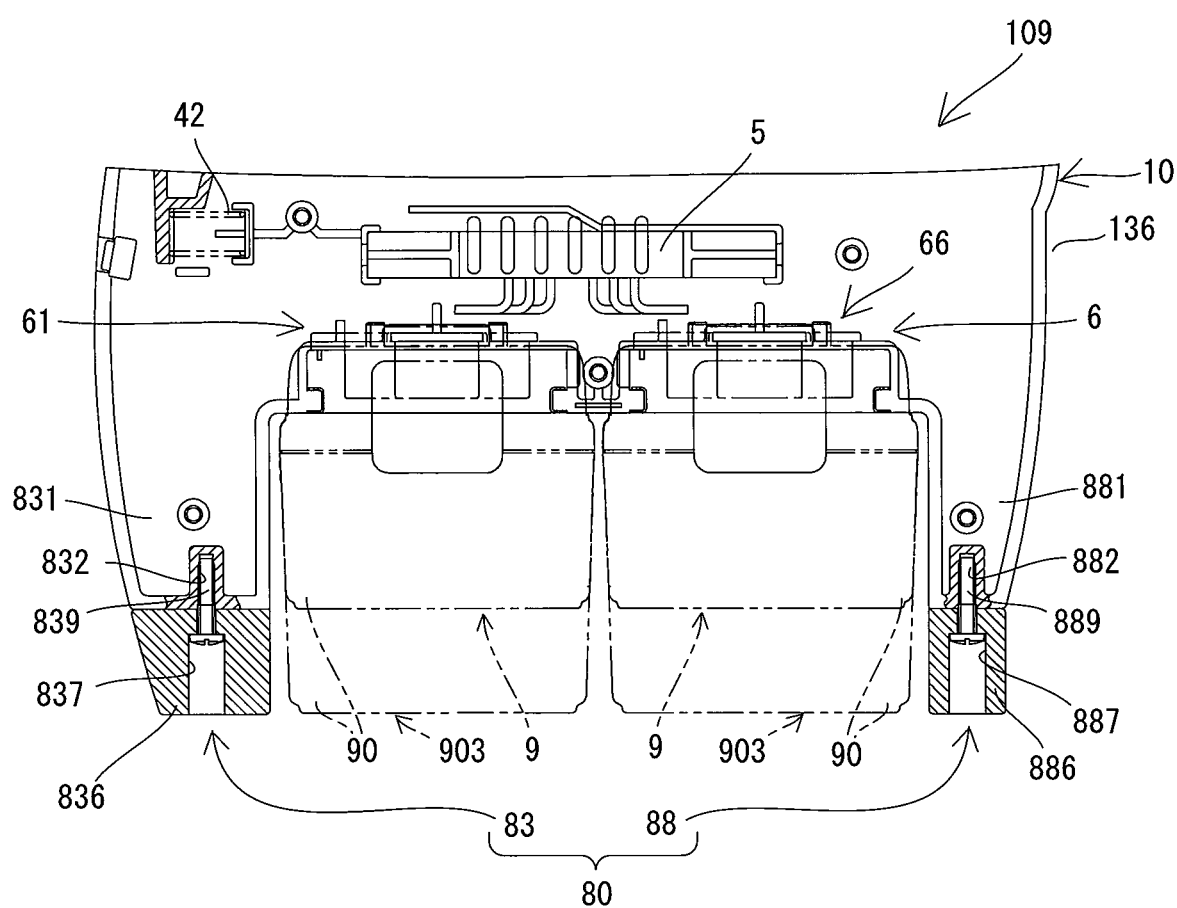
FIG. 12 is a longitudinal sectional view of a portion of a hammer drill according to an embodiment.
Figure 13:
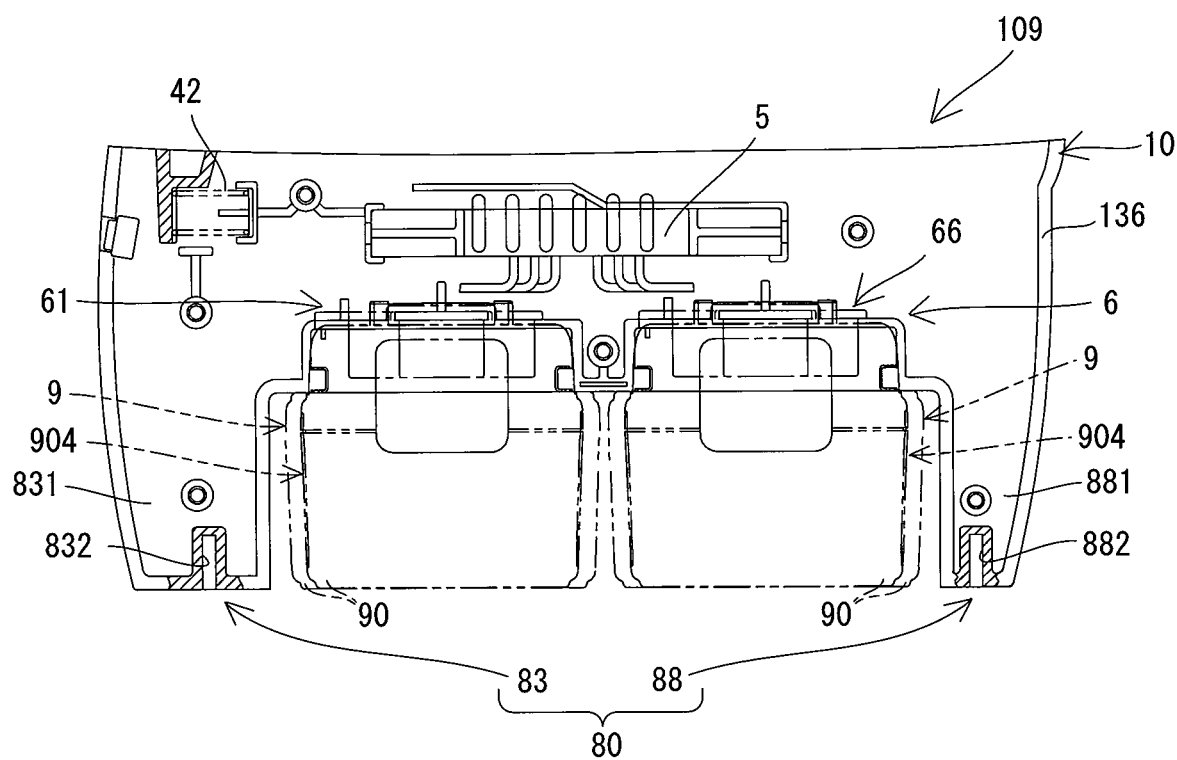
FIG. 13 is another longitudinal sectional view of a portion of the hammer drill.

As shown in FIG. 12, the battery protection part 80 of the present embodiment includes a front protection part 83 and a rear protection part 88. The front protection part 83 includes a base 831 and an additional part 836 which is configured to be removably attached to the base 831. Similarly, the rear protection part 88 includes a base 881 and an additional part 886 which is configured to be removably attached to the base 881.

The bases 831, 881 respectively correspond to the front and rear protection parts 71, 76 of the first embodiment. Specifically, the bases 831, 881 are formed as portions of the housing 10 (the lower part 136). The bases 831, 881 extend downward relative to the battery mounting part 6, on the front and rear sides of the battery mounting part 6. The bases 831, 881 are configured such that lower surfaces of the bases 831, 881 are generally flush with the lower surfaces of the batteries 9 when the batteries 9 are mounted to the battery mounting part 6. Further, screw holes 832, 882 are respectively formed in lower end portions of the bases 831, 881.

The additional parts 836, 886 are configured to be fixed to the bases 831, 881 with screws 839, 889 in the state that upper surfaces of the additional parts 836, 886 are in contact with lower surfaces of the bases 831, 881, respectively. Specifically, stepped holes 837, 887 are formed that extend in the up-down direction through the additional parts 836, 886, respectively. The additional parts 836, 886 may be fixed to the bases 831, 881 by inserting the screws 839, 889 through the stepped holes 837, 887 from below and threadably engaging the screws 839, 889 with the screw holes 832, 882 of the bases 831, 881. It is noted that the additional parts 836, 886 may be formed of the same material as the bases 831, 881, or formed of a different material from the bases 831, 881, like in the second embodiment. The additional parts 836, 886 are configured such that lower surfaces of the additional parts 836, 886 fixed to the bases 831, 881 are generally flush with lower surfaces of batteries 903 when the batteries 903 are mounted to the battery mounting part 6. The battery 903 has a larger capacity and a greater height in the up-down direction than the battery 9, and has the same width in the front-rear direction and the same length in the right-left direction as the battery 9.

When using the batteries 9 as a power source, the user may use the hammer drill 109 with the additional parts 836, 886 fixed to the bases 831, 881. Alternatively, the user may use the hammer drill 109 with the additional parts 836, 886 removed from the bases 831, 881 by removing the screws 839, 889. In either case, the battery protection part 80 can protect the corner regions 90 of the batteries 9 against external force and reduce the risk of damage to the batteries 9. Further, when the hammer drill 109 is used with the additional parts 836, 886 removed from the bases 831, 881, the hammer drill 109 can be placed on the ground or floor in a stable posture with the lower surfaces of the bases 831, 881 and lower surfaces of the batteries 9 as placing surfaces.

When using the batteries 903 as a power source, the user may fix the additional parts 836, 886 to the bases 831, 881, so that the height of the battery protection part 80 is increased. In this manner, the battery protection part 80 can protect the corner regions 90 of the batteries 903 against external force and reduce the risk of damage to the batteries 903. Further, the hammer drill 109 can be placed on the ground or floor in a stable posture with lower surfaces of the additional parts 836, 886 and lower surfaces of the batteries 903 as placing surfaces.

It is noted that the batteries 9, 903 have the largest width in the front-rear direction (right-left direction in FIG. 12) of all the batteries which can be removably mounted to the battery mounting part 6. Therefore, in the battery protection part 80, the distance between the front protection part 83 and the rear protection part 88 in the front-rear direction is set according to the width of the batteries 9, 903. The same is true for the battery protection part 7 (see FIG. 1), the battery protection part 70 (see FIG. 3) and the battery protection part 700 (see FIG. 5). As shown in FIG. 13, when batteries 904 having a smaller width in the front-rear direction and having a smaller capacity than the batteries 9, 903 are mounted to the battery mounting part 6, the battery protection part 80 can also protect the corner regions 90 of the batteries 904 against external force and reduce the risk of damage to the batteries 904. The batteries 904 have the same height in the up-down direction and the same length in the right-left direction as the batteries 9, so that the lower surfaces of the bases 831, 881 are generally flush with lower surfaces of the batteries 904.

In the hammer drill 109 having the above-described structure according to the present embodiment, a user can appropriately adjust the height of the battery protection part 80 in the up-down direction according to the size of the batteries which are selected from various kinds of batteries varying in size and mounted to the battery mounting part 6. Thus, if any of the batteries is mounted to the battery mounting part 6, the corner regions 90 of the batteries can be protected and the risk of damage to the batteries can be reduced. In the present embodiment, the battery protection part 80, the front protection part 83 and the rear protection part 88 are examples that correspond to the "battery protection part", the "front protection part" and the "rear protection part", respectively, according to the present teachings. It is noted that the additional parts 836, 886 may be removably mounted to the bases 831, 881 by methods other than using the screws 839, 889.

The above-described embodiments are mere examples and a power tool according to the present teachings is not limited to the structures of the hammer drills 101 to 109 of the above-described embodiments. For example, the following modifications may be made. Further, one or more of these modifications may be used in combination with any one of the hammer drills 101 to 109 of the above-described embodiments or any one of the claims.

Any one of the battery protection parts 7, 70, 700, 8, 80 of the above-described embodiments may be applied to a power tool other than the hammer drill 101 to 109. The power tool may generally refer to a tool which is configured to be operated by power supply from a battery and used in industry, construction etc. For example, any one of the battery protection parts 7, 70, 700, 8, 80 may be applied to a so-called rotary tool (e.g. shear wrench) which is configured to rotationally drive a final output shaft. In this case, a rotation axis of the final output shaft corresponds to the working axis A1.

The structure (shape, number, arrangement position) of the battery protection part 7, 70, 700, 8, 80 may be appropriately changed within such a range that the battery protection part 7, 70, 700, 8, 80 can protect at least one corner region 90 of the battery 9, 903, 904 against external force. For example, in the first to third and fifth to ninth embodiments, the lower end of the battery protection part 7, 70, 700, 8, 80 may be arranged below the lower surfaces of the batteries 9, 903, 904 mounted to the battery mounting part 6. The width of the battery protection part 7, 70, 700, 8, 80 in the right-left direction may be not less than the width of the batteries 9, 903, 904 in the right-left direction. Further, in the fourth embodiment, the pair of front protection parts 81 and the pair of rear protection parts 86 may be connected by a rod member or plate member below the lower surfaces of the batteries 9 for reinforcement.

Further, in the first to third and fifth to ninth embodiments, the front protection part 71, 72, 73, 83 may be formed to protrude from the virtual planes that are perpendicular to the virtual lines connecting the center of gravity G and the corner regions 90 of the front lower end portions of the front battery 9, 903, 904, respectively, and that pass through the corner regions 90, respectively. In this case, even if the hammer drill drops in the state that the center of gravity G is located right above either one of the corner regions 90 of the front lower end portion, the front protection part 71, 72, 73, 83 can effectively protect the corner region 90 of the front lower end portion against impact of dropping.

Each of the hammer drills 101 to 109 uses the tool accessory 18 having a relatively large diameter, and employs a crank mechanism as the motion converting mechanism 30. Thus, each of the hammer drills 101 to 109 is a large power tool having a total weight (including the weight of the auxiliary handle) that exceeds 6 kg with the two batteries 9 mounted thereto. As described above, having a capacity of 18 volt, the battery 9 itself is also relatively heavy. Further, the total weight of each of the hammer drill 101 to 109 (including the auxiliary handle) having the two batteries 9 mounted thereto exceeds five times of the weight of the two batteries 9. In the case of a large power tool having such a weight ratio, when the power tool drops in the state that its center of gravity is located right above a corner region of a battery and the corner region collides with the ground or floor, the risk of damage to the battery may further increase. Therefore, in a power tool of which total weight including the batteries exceeds five times of the weight of the batteries (a power tool of which total weight exceeds 6 kg with the batteries mounted thereto, in particular), it may be particularly preferred that a battery protection part is configured to protrude from a virtual plane that is perpendicular to a virtual line connecting the center of gravity of the power tool having the batteries mounted thereto and a corner region of the battery and that passes through the corner region, in a direction away from the center of gravity.

In the third embodiment, the covering member 79 mounted to the lower part 138 may be omitted. On the contrary, in the first, second, fourth to ninth embodiments, a similar covering member may be mounted to the lower part 136, 137, 139.

In the fourth embodiment, like in the second embodiment, all of the front and rear protection parts 81, 86 may be formed as separate members from the housing 10 (the lower part 139) and attached to the housing 10. Alternatively, like in the third embodiment, a portion of each of the front and rear protection parts 81, 86 may be formed as a portion of the housing 10 (the lower part 139), and the remaining portion may be formed as a separate member from the housing 10 (the lower part 139) and attached to the housing 10.

The number of the batteries 9, 903, 904 which can be removably mounted to the battery mounting part 6, 60 is not limited to two, and may be one, or three or more. When the battery mounting part is of the type that one battery 9, 903, 904 can be removably mounted, the battery protection part may be configured to protect against external force at least one corner region 90 of an end portion (lower end portion) of the battery 9, 903, 904 that is opposite from another end portion (the upper end portion) of the battery 9, 903, 904 which is mounted to the battery mounting part. More preferably, the battery protection part may be configured to protect all of the corner regions 90 of the lower end portion against the external force. Further, as for a protection part which corresponds to a corner region 90 that is particularly liable to be subjected to impact when the hammer drill drops in the state that the center of gravity is located right above the corner region 90, it may be particularly preferable that such protection part is configured to protrude from the virtual plane described in the above embodiments.

When, like the battery mounting part 6, 60, the batteries 9, 903, 904 are removably mounted side by side in a prescribed direction (e.g. the extending direction of the working axis A1 (the front-rear direction), the direction perpendicular to the working axis A1 and the rotation axis A2 (the right-left direction)), the batteries 9, 903, 904 may be considered as one battery group. In this case, the battery protection part may be configured to protect against external force at least one corner region 90 of an end portion (lower end portion) of the battery group that is opposite from another end portion (the upper end portion) of the battery group which is removably mounted to the battery mounting part.

In the case of the battery group, it may be more preferable that the battery protection part is configured to protect all of the corner regions 90 of the lower end portion of the battery group as a whole against external force. In other words, it may be preferable that the battery protection part is configured to protect against external force the corner region 90 of the lower end portion of one of the batteries 9, 903, 904 forming the battery group which is arranged at the end in a first direction of a prescribed direction (in which the batteries 9, 903, 904 are arranged side by side) and the corner region 90 of the lower end portion of another of the batteries 9, 903, 904 which is arranged at the end in a second direction opposite to the first direction of the prescribed direction.

For example, when the batteries 9, 903, 904 having a generally rectangular parallelepiped shape are mounted side by side in the front-rear direction, it may be preferable that the battery protection part is configured to protect against external force the two corner regions 90 of the front lower end portion of the frontmost battery 9, 903, 904 of the battery group and the two corner regions 90 of the rear lower end portion of the rearmost battery 9, 903, 904 of the battery group. In this case, like in the first to third and the fifth to ninth embodiments, the battery protection part may include two parts, each of which protects two corner regions 90. Alternatively, like in the fourth embodiment, the battery protection part may include four parts, each of which protects one corner region 90. Further, the battery protection part may be configured to include one or three parts which protect the four corner regions. When battery having a shape other than a rectangular parallelepiped shape is removably mounted, the structure of the battery protection part may be appropriately changed according to the number and the position of the corner regions of the battery.

Further, in the above-described embodiments, the housing 10 includes the first housing 11 and the second housing 13 which are elastically connected to each other in a relatively movable manner. The housing 10, however, may not need to be configured as a so-called vibration-isolating housing. Even when the vibration-isolating housing structure is employed, the housing structure may be appropriately changed. For example, the lower part 136, 137, 138, 139 may be integrally formed with the motor housing part 111 as a portion of the first housing 11. Further, the second housing 13 including the grip part 131 and the upper part 133 may be elastically connected to the first housing 11 in a relatively movable manner. In this case, the battery protection part 7, 70, 700, 8, 80 may be provided not on the second housing 13 but on the first housing 11. Further, a structure like in the above-described embodiments in which the battery mounting part and the battery protection part are provided on the second housing that is elastically connected to the first housing which houses a source of vibration (i.e. the motor 2, the driving mechanism 3) in the vibration-isolating housing, may be preferable for obtaining the effects of preventing chattering and improving the vibration isolating effect.

In view of the natures of the present teachings and the above-described embodiments, the following aspects may be provided. Each of the aspects can be used in combination with any one or more of the hammer drills 101 to 109 of the above-described embodiments, the above-described modifications or the claims.

<Aspect 1>

When the power tool is arranged such that the working axis extends in a horizontal direction and the rotation axis extends in a vertical direction, the battery mounting part may be arranged below the motor, the battery mounting part may be configured such that an upper end portion of a battery group is mounted to the battery mounting part and a lower end portion of the battery group is exposed from the housing, the battery group including the at least one battery, and the battery protection part may be configured to protect all corner regions of the lower end portion of the battery group against the external force.

<Aspect 2>

When the power tool is arranged such that the working axis extends in a horizontal direction and the rotation axis extends in a vertical direction, the battery mounting part may be arranged below the motor, the battery mounting part may be configured such that upper end portions of a plurality of batteries arranged side by side in a prescribed direction are mounted to the battery mounting part and lower end portions of the plurality of batteries are exposed from the housing, and the battery protection part may be configured to protect a corner region of a lower end portion of one of the plurality of batteries which is arranged at an end in a first direction of the prescribed direction and a corner region of a lower end portion of one of the plurality of batteries which is arranged at an end in a second direction opposite to the first direction of the prescribed direction, against the external force.

<Aspect 3>

In aspect 2, the prescribed direction may be the front-rear direction, and the battery protection part may be configured to protect a corner region of a front lower end portion of frontmost one of the plurality of batteries and a corner region of a rear lower end portion of rearmost one of the plurality of batteries, against the external force.

<Aspect 4>

A total weight of the power tool having the at least one battery mounted to the battery mounting part may exceed five times of a weight of the at least one battery, and the battery protection part may be configured to protrude from a virtual plane in a direction away from a center of gravity of the power tool having the battery mounted to the battery mounting part, the virtual plane being perpendicular to a virtual line and passing through the corner region, the virtual line connecting the center of gravity and the corner region.

<Aspect 5>

In aspect 4, the power tool may be an impact tool to which a tool accessory is removably attachable and which is configured to linearly drive the tool accessory along the working axis via a striking element, and may include a crank mechanism which is housed in the housing and configured to convert rotational motion of the motor into linear motion and transmit the linear motion to the striking element.

<Aspect 6>

The battery protection part may include a rear protection part arranged on a rear side of the battery mounting part in the front-rear direction, and the rear protection part may be configured to protrude from a virtual plane in a direction away from a center of gravity of the power tool having the battery mounted to the battery mounting part, the virtual plane being perpendicular to a virtual line and passing through the corner region, the virtual line connecting the center of gravity and the corner region.

DESCRIPTION OF THE NUMERALS

101, 102, 103, 104, 105, 106, 107, 108, 109: hammer drill
2: motor
25: motor shaft
29: driving gear
3: driving mechanism
30: motion converting mechanism
31: crank shaft
32: connecting rod
33: piston
34: tool holder
35: cylinder
36: striking mechanism
361: striker
363: impact bolt
365: air chamber
38: rotation transmitting mechanism
4: mode switching dial
41: first spring
42: second spring
46: upper sliding part
47: lower sliding part
5: controller
6, 60: battery mounting part
61, 62: front mounting part
66, 67: rear mounting part
601: hook engagement part
603: guide rail
605: battery connection terminal
7, 70, 700, 8, 80: battery protection part
71, 72, 73, 81, 83: front protection part
76, 77, 78, 86, 88: rear protection part
831, 881: base
832, 882: screw hole
836, 886: additional part
837, 887: stepped hole
839, 889: screw
711: wireless interlock unit
712: USB terminal 713: distance sensor
731: stepped part
801: reinforcing rib
803, 805: reinforcing member
79: covering member
791: lower surface part
792: side surface part
793: upper surface part
9, 903, 904: battery
90: corner region
91: hook
93: guide groove
95: button
900, 901: battery group
10: housing
11: first housing
111: motor housing part
117: driving mechanism housing part
13: second housing
131: grip
133: upper part
134: barrel
136, 137, 138, 139: lower part
14: trigger
145: switch
18: tool accessory
A1: working axis
A2: rotation axis
G: center of gravity

What is claimed is:

1. A power tool, comprising:
a motor having a rotation axis, the rotation axis extending in a direction crossing a working axis, the working axis defining a front-rear direction of the power tool;
a housing that houses the motor;
a battery mounting part provided to the housing and configured such that at least one battery can be removably mounted thereto; and
a battery protection part provided to an outer surface portion of the housing,
wherein:
the battery mounting part (1) is configured such that one end portion of the at least one battery is mounted to the battery mounting part and an opposite end portion of the at least one battery in the extending direction of the rotation axis is exposed from the battery mounting part and (2) is located on an opposite side of the motor from the working axis;
the battery protection part (1) is configured to protect at least one corner region of the opposite end portion of the at least one battery against external force when the one end portion is mounted to the battery mounting part and (2) includes a front protection part and a rear protection part;
the front protection part and the rear protection part are spaced and on opposite sides of the battery mounting part in the front-rear direction; and
the front protection part faces a front surface of the at least one battery and the rear protection part faces a rear surface of the at least one battery when the at least one battery is mounted to the battery mounting part.

2. The power tool as defined in claim 1, wherein the battery protection part is formed by a portion of the housing.

3. The power tool as defined in claim 2, wherein the portion of the housing forming the battery protection part is formed of resin, and the power tool further comprises a metal reinforcing member, at least a portion of the reinforcing member being arranged in the battery protection part.

4. The power tool as defined in claim 1, wherein the battery protection part is formed as a separate member from the housing and mounted to the housing.

5. The power tool as defined in claim 4, wherein the battery protection part is formed of a different material from the housing.

6. The power tool as defined in claim 1, wherein the battery protection part includes a pair of front protection parts and a pair of rear protection parts, the pair of front protection parts being arranged on opposite sides of a front region of the battery mounting part in a direction crossing the working axis and the rotation axis, and the pair of rear protection parts being arranged on opposite sides of a rear region of the battery mounting part in the direction crossing the working axis and the rotation axis.

7. The power tool as defined in claim 1, wherein:
when the power tool is arranged such that the working axis extends in a horizontal direction and the rotation axis extends in a vertical direction, the battery mounting part is arranged below the motor, and
the battery protection part is configured such that a lower surface of the battery protection part is generally flush with a lower surface of the battery when the battery is mounted to the battery mounting part.

8. The power tool as defined in claim 1, wherein the battery protection part is configured to protrude from a virtual plane in a direction away from a center of gravity of the power tool having the battery mounted to the battery mounting part, the virtual plane being perpendicular to a virtual line connecting the center of gravity and the corner region of the battery, and the virtual plane also passing through the corner region.

9. The power tool as defined in claim 1, further comprising an additional mechanism arranged in an internal space of the battery protection part and configured to have a different function from protection of the corner region.

10. The power tool as defined in claim 1, wherein the battery mounting part is configured such that plural kinds of batteries having different lengths in the extending direction of the rotation axis can be selectively removably mounted to the battery mounting part, and the battery protection part is configured to be adjustable in length in the extending direction of the rotation axis.

11. The power tool as defined in claim 1, wherein:
when the power tool is arranged such that the working axis extends in a horizontal direction and the rotation axis extends in a vertical direction, the battery mounting part is arranged below the motor,
the battery mounting part is configured such that an upper end portion of a battery group is mounted to the battery mounting part and a lower end portion of the battery group is exposed from the housing, the battery group including the at least one battery, and
the battery protection part is configured to protect all corner regions of the lower end portion of the battery group against the external force.

12. The power tool as defined in claim 1, wherein:
a total weight of the power tool having the at least one battery mounted to the battery mounting part exceeds five times of a weight of the at least one battery, and
the battery protection part is configured to protrude from a virtual plane in a direction away from a center of gravity of the power tool having the at least one battery mounted to the battery mounting part, the virtual plane being perpendicular to a virtual line and passing through the corner region, the virtual line connecting the center of gravity and the corner region.

13. The power tool as defined in claim 12, wherein:
the power tool is an impact tool to which a tool accessory is removably attachable,
the power tool is configured to linearly drive the tool accessory along the working axis via a striking element, and
the power tool includes a crank mechanism housed in the housing and configured to convert rotational motion of the motor into linear motion and transmit the linear motion to the striking element.

14. The power tool as defined in claim 1, wherein
the battery protection part includes a rear protection part arranged on a rear side of the battery mounting part in the front-rear direction, and
the rear protection part is configured to protrude from a virtual plane in a direction away from a center of gravity of the power tool having the battery mounted to the battery mounting part, the virtual plane being perpendicular to a virtual line and passing through the corner region, the virtual line connecting the center of gravity and the corner region.

15. The power tool as defined in claim 1, wherein the front protection part and the rear protection part protrude below the battery mounting part in a direction transverse to the front-rear direction.

16. The power tool as defined in claim 1, further comprising a grip part (1) configured to be engaged by a hand of a user and (2) having a longitudinal axis that is substantially parallel to the rotation axis, wherein:
a front end of the front protection part is generally at the same position in the front-rear direction as a front end of a motor housing part of the housing; and
a rear end of the rear protection part is generally in the same position in the front-rear direction as a rear end of the grip portion.

17. A power tool, comprising:
a motor having a rotation axis, the rotation axis extending in a direction crossing a working axis, the working axis defining a front-rear direction of the power tool;
a housing that houses the motor;
a battery mounting part provided to the housing and configured such that a plurality of batteries can be removably mounted thereto side-by-side in the front-rear direction; and
a battery protection part provided to an outer surface portion of the housing,
wherein:
the battery mounting part is configured such that one end portion of each of the plurality of batteries is mounted to the battery mounting part and an opposite end portion of the each of the plurality of batteries in the extending direction of the rotation axis is exposed from the battery mounting part; and
the battery protection part is configured to protect at least one corner region of the opposite end portion of at least one battery of the plurality of batteries against external force when the one end portion of the at least one battery of the plurality of batteries is mounted to the battery mounting part.

18. A power tool, comprising:
a motor having a rotation axis, the rotation axis extending in a direction crossing a working axis, the working axis defining a front-rear direction of the power tool;
a housing that houses the motor;
a battery mounting part provided to the housing and configured such that a plurality of batteries can be removably mounted thereto such that upper end portions of the plurality of batteries are mounted to the battery mounting part and lower end portions of the plurality of batteries are exposed from the housing, the plurality of batteries being arranged side by side in a prescribed direction; and
a battery protection part provided to an outer surface portion of the housing,
wherein:
the battery protection part is configured to protect against external force at least one corner region of the lower end portion of a first battery of the plurality of batteries and at least one corner region of the lower end portion of a second battery of the plurality of batteries when the first and second batteries are mounted to the battery mounting part;
the first battery being one of the plurality of batteries arranged at an end in a first direction of the prescribed direction; and
the second battery being another of the plurality of batteries arranged at an end in a second direction opposite to the first direction of the prescribed direction; and
when the power tool is arranged such that the working axis extends in a horizontal direction and the rotation axis extends in a vertical direction, the battery mounting part is arranged below the motor.

19. The power tool as defined in claim 18, wherein:
the prescribed direction is the front-rear direction,
the first battery is frontmost one of the plurality of batteries, and the second battery is rearmost one of the plurality of batteries, and
the battery protection part is configured to protect against the external force at least one corner region of a front lower end portion of the first battery and at least one corner region of a rear lower end portion of the second battery.

* * * * *